（12）United States Patent
Olivier et al.

(10) Patent No.: US 7,748,038 B2
(45) Date of Patent: Jun. 29, 2010

(54) METHOD AND APPARATUS FOR MANAGING COMPUTER VIRUS OUTBREAKS

(75) Inventors: Michael Olivier, Belmont, CA (US);
Craig Sprosts, San Francisco, CA (US);
Scot Kennedy, San Francisco, CA (US);
Daniel Quinlan, San Bruno, CA (US);
Larry Rosenstein, Pacifica, CA (US);
Craig Taylor, Portola Valley, CA (US)

(73) Assignee: IronPort Systems, Inc., San Bruno, CA (US)

( * ) Notice: Subject to any disclaimer, the term of this patent is extended or adjusted under 35 U.S.C. 154(b) by 734 days.

(21) Appl. No.: 11/006,209

(22) Filed: Dec. 6, 2004

(65) Prior Publication Data
US 2005/0283837 A1 Dec. 22, 2005

Related U.S. Application Data

(60) Provisional application No. 60/580,446, filed on Jun. 16, 2004.

(51) Int. Cl.
*G06F 9/00* (2006.01)
*G06F 11/00* (2006.01)
(52) U.S. Cl. .............................. 726/24; 713/188; 726/22
(58) Field of Classification Search .................. 713/188; 726/22–25
See application file for complete search history.

(56) References Cited

U.S. PATENT DOCUMENTS 4,956,769 A 9/1990 Smith
5,319,776 A 6/1994 Hile et al.
5,623,600 A 4/1997 Ji et al.
5,802,178 A 9/1998 Holden et al.
5,805,810 A 9/1998 Maxwell (Continued)

FOREIGN PATENT DOCUMENTS

EP 1509014 A2 2/2005

(Continued)

OTHER PUBLICATIONS

"SpamAssassin: Tests Performed," Jun. 4, 2003, SpamAssassin.*

(Continued)

*Primary Examiner*—Kimyen Vu
*Assistant Examiner*—Darren Schwartz
(74) *Attorney, Agent, or Firm*—Hickman Palermo Truong & Becker LLP

(57) ABSTRACT

Early detection of computer viruses is provided by collecting information about suspicious messages and generating virus outbreak information. In one embodiment, a method comprises receiving the virus outbreak information that has been determined by receiving message information for messages that have characteristics associated with computer viruses, wherein the messages were determined by a virus-check component as not comprising a virus, and mapping the message information received in a specified time period to the virus outbreak information; and when the virus outbreak information indicates initiation of a virus attack, performing a message flow control action for additional messages that have the same characteristics associated with computer viruses as the first messages. As a result, a messaging gateway can suspend delivery of messages early in a virus outbreak, providing sufficient time for updating an anti-virus checker that can strip virus code from the messages.

37 Claims, 6 Drawing Sheets

U.S. PATENT DOCUMENTS

| | | | |
|---|---|---|---|
| 5,832,208 | A | 11/1998 | Chen et al. |
| 5,889,943 | A | 3/1999 | Ji et al. |
| 5,915,087 | A | 6/1999 | Hammond et al. |
| 5,933,416 | A | 8/1999 | Schenkel et al. |
| 5,958,005 | A | 9/1999 | Thorne et al. |
| 5,968,176 | A | 10/1999 | Nesset et al. |
| 5,970,149 | A | 10/1999 | Johnson |
| 5,983,270 | A | 11/1999 | Abraham et al. |
| 5,983,350 | A | 11/1999 | Minear et al. |
| 5,999,967 | A | 12/1999 | Sundsted |
| 6,003,084 | A | 12/1999 | Green et al. |
| 6,006,329 | A | 12/1999 | Chi |
| 6,052,709 | A | 4/2000 | Paul |
| 6,072,942 | A | 6/2000 | Stockwell et al. |
| 6,119,236 | A * | 9/2000 | Shipley ................... 726/22 |
| 6,131,110 | A | 10/2000 | Bates et al. |
| 6,161,130 | A | 12/2000 | Horvitz et al. |
| 6,161,185 | A | 12/2000 | Guthrie et al. |
| 6,192,114 | B1 | 2/2001 | Council |
| 6,195,587 | B1 | 2/2001 | Hruska et al. |
| 6,212,558 | B1 | 4/2001 | Antur et al. |
| 6,226,670 | B1 | 5/2001 | Ueno et al. |
| 6,233,618 | B1 | 5/2001 | Shannon |
| 6,266,664 | B1 | 7/2001 | Russell-Falla et al. |
| 6,266,692 | B1 | 7/2001 | Greenstein |
| 6,289,105 | B1 | 9/2001 | Murota |
| 6,330,590 | B1 | 12/2001 | Cotton |
| 6,334,193 | B1 | 12/2001 | Buzsaki |
| 6,341,309 | B1 | 1/2002 | Vaid et al. |
| 6,393,568 | B1 | 5/2002 | Ranger et al. |
| 6,408,336 | B1 | 6/2002 | Schneider et al. |
| 6,421,709 | B1 | 7/2002 | McCormick et al. |
| 6,434,600 | B2 | 8/2002 | Waite et al. |
| 6,453,327 | B1 | 9/2002 | Nielson |
| 6,460,050 | B1 | 10/2002 | Pace et al. |
| 6,484,261 | B1 | 11/2002 | Wiegel |
| 6,502,131 | B1 | 12/2002 | Vaid et al. |
| 6,507,866 | B1 | 1/2003 | Barchi |
| 6,539,430 | B1 | 3/2003 | Humes |
| 6,587,550 | B2 | 7/2003 | Council et al. |
| 6,591,291 | B1 | 7/2003 | Gabber et al. |
| 6,609,196 | B1 | 8/2003 | Dickinson, III et al. |
| 6,650,890 | B1 | 11/2003 | Irlam et al. |
| 6,654,787 | B1 * | 11/2003 | Aronson et al. ............. 709/206 |
| 6,675,162 | B1 | 1/2004 | Russell-Falla et al. |
| 6,701,440 | B1 * | 3/2004 | Kim et al. .................... 726/24 |
| 6,728,690 | B1 | 4/2004 | Meek et al. |
| 6,732,157 | B1 | 5/2004 | Gordon et al. |
| 6,757,830 | B1 | 6/2004 | Tarbotton et al. |
| 6,785,732 | B1 | 8/2004 | Bates et al. |
| 6,886,099 | B1 * | 4/2005 | Smithson et al. ............. 726/24 |
| 6,894,981 | B1 | 5/2005 | Coile et al. |
| 6,944,616 | B2 | 9/2005 | Ferguson et al. |
| 7,076,527 | B2 | 7/2006 | Bellegarda et al. |
| 7,181,498 | B2 | 2/2007 | Zhu et al. |
| 7,206,814 | B2 | 4/2007 | Kirsch |
| 7,219,148 | B2 | 5/2007 | Rounthwaite et al. |
| 7,272,853 | B2 | 9/2007 | Goodman et al. |
| 7,331,061 | B1 * | 2/2008 | Ramsey et al. ................ 726/23 |
| 7,342,906 | B1 | 3/2008 | Calhoun |
| 7,366,761 | B2 | 4/2008 | Murray et al. |
| 7,409,708 | B2 | 8/2008 | Goodman et al. |
| 7,475,118 | B2 | 1/2009 | Leiba et al. |
| 7,523,168 | B2 | 4/2009 | Chadwick et al. |
| 7,610,344 | B2 | 10/2009 | Mehr et al. |
| 7,627,670 | B2 | 12/2009 | Haverkos |
| 2001/0005885 | A1 | 6/2001 | Elgamal et al. |
| 2002/0004908 | A1 | 1/2002 | Galea |
| 2002/0016824 | A1 | 2/2002 | Leeds |
| 2002/0073240 | A1 | 6/2002 | Kokkinen et al. |
| 2002/0133469 | A1 | 9/2002 | Patton |
| 2002/0143888 | A1 | 10/2002 | Lisiecki et al. |
| 2002/0184315 | A1 | 12/2002 | Earnest |
| 2002/0199095 | A1 * | 12/2002 | Bandini et al. .............. 713/151 |
| 2003/0023875 | A1 * | 1/2003 | Hursey et al. ................ 713/201 |
| 2003/0050988 | A1 | 3/2003 | Kucherawy |
| 2003/0079142 | A1 | 4/2003 | Margalit et al. |
| 2003/0088680 | A1 | 5/2003 | Nachtenberg et al. |
| 2003/0093689 | A1 | 5/2003 | Elzam et al. |
| 2003/0097591 | A1 | 5/2003 | Pham et al. |
| 2003/0110224 | A1 | 6/2003 | Cazier et al. |
| 2003/0115485 | A1 * | 6/2003 | Milliken ..................... 713/201 |
| 2003/0149726 | A1 | 8/2003 | Spear |
| 2003/0158905 | A1 | 8/2003 | Petry et al. |
| 2003/0167402 | A1 | 9/2003 | Stolfo et al. |
| 2003/0172050 | A1 | 9/2003 | Decime et al. |
| 2003/0172291 | A1 | 9/2003 | Judge et al. |
| 2003/0185391 | A1 | 10/2003 | Qi et al. |
| 2003/0208562 | A1 | 11/2003 | Hauck et al. |
| 2004/0006747 | A1 * | 1/2004 | Tyler .......................... 715/530 |
| 2004/0019651 | A1 | 1/2004 | Andaker |
| 2004/0054742 | A1 | 3/2004 | Gruper et al. |
| 2004/0054917 | A1 * | 3/2004 | Obrecht et al. .............. 713/200 |
| 2004/0058673 | A1 | 3/2004 | Irlam et al. |
| 2004/0064371 | A1 | 4/2004 | Crapo |
| 2004/0068542 | A1 | 4/2004 | Lalonde et al. |
| 2004/0073617 | A1 | 4/2004 | Milliken et al. |
| 2004/0083230 | A1 | 4/2004 | Caughey |
| 2004/0083408 | A1 | 4/2004 | Spiegel et al. |
| 2004/0093384 | A1 | 5/2004 | Shipp |
| 2004/0117648 | A1 * | 6/2004 | Kissel ........................ 713/200 |
| 2004/0167968 | A1 | 8/2004 | Wilson et al. |
| 2004/0177120 | A1 | 9/2004 | Kirsch |
| 2004/0215977 | A1 | 10/2004 | Goodman et al. |
| 2004/0250115 | A1 | 12/2004 | Gemmel et al. |
| 2004/0250134 | A1 * | 12/2004 | Kohler et al. ................ 713/201 |
| 2004/0260922 | A1 | 12/2004 | Goodman et al. |
| 2005/0005107 | A1 | 1/2005 | Touboul |
| 2005/0060295 | A1 * | 3/2005 | Gould et al. ..................... 707/3 |
| 2005/0060643 | A1 * | 3/2005 | Glass et al. ............... 715/501.1 |
| 2005/0064850 | A1 | 3/2005 | Irlam et al. |
| 2005/0071485 | A1 | 3/2005 | Ramagopal |
| 2005/0080856 | A1 | 4/2005 | Kirsch |
| 2005/0108518 | A1 | 5/2005 | Pandya |
| 2005/0177868 | A1 | 8/2005 | Kwan |
| 2005/0182959 | A1 | 8/2005 | Petry et al. |
| 2005/0193429 | A1 | 9/2005 | Demopoulos et al. |
| 2005/0246440 | A1 | 11/2005 | Yu |
| 2005/0265319 | A1 | 12/2005 | Clegg et al. |
| 2005/0283837 | A1 | 12/2005 | Olivier et al. |
| 2006/0095410 | A1 | 5/2006 | Ostrover et al. |
| 2006/0123083 | A1 | 6/2006 | Goutte et al. |
| 2006/0149820 | A1 | 7/2006 | Rajan et al. |
| 2006/0161988 | A1 | 7/2006 | Costea et al. |
| 2008/0104186 | A1 | 5/2008 | Wieneke et al. |
| 2008/0104187 | A1 | 5/2008 | Wilson et al. |
| 2008/0256072 | A1 | 10/2008 | Logan et al. |
| 2008/0270540 | A1 | 10/2008 | Larsen |
| 2009/0019126 | A1 | 1/2009 | Adkins |

FOREIGN PATENT DOCUMENTS

| | | |
|---|---|---|
| WO | WO 01/67330 A1 | 9/2001 |
| WO | WO 02/25464 A1 | 3/2002 |
| WO | WO 02/39356 A1 | 5/2002 |
| WO | WO 02/019069 A | 7/2002 |

OTHER PUBLICATIONS

Achelis, Steven B. "Technical Analysis from A to Z," Equis International, 2001.*

"VisualRoute Server," Mar. 12, 2001, Visualware Inc.*

Kephart, Jeffrey O. et al., "Biologically Inspired Defenses Against Computer Viruses," 1995, International Joint Conference on Artificial Intelligence.*

Mertz, David, "Spam Filtering Techniques," Aug. 2002, pp. 1-8.*
Patent Cooperation Treaty, "Notification Concerning Transmittal of International Preliminary Report on Patentability," PCT/US2005/005498, 7 pages.
International Searching Authority, "Notification of transmittal of the international search report and the written opinion of the international searching authority, or the declaration," International Application No. PCT/US05/19037, dated Oct. 24, 2005, 10 pages.
Current claims, PCT/US05/19037, 12 pages.
International Searching Authority, "Notification of Transmittal of the International Search Report and the Written Opinion of the International Searching Authority, or the Declaration," PCT/US05/19143 (60063-0104), Dated Apr. 7, 2006, 8 pages.
Current Claims, PCT/US05/19143, 24 pages.
International Searching Authority, "Notification of transmittal of the international search report and the written opinion of the international searching authority, or the declaration," international application No. PCT/US2005/005498, dated May 18, 2005, 12 pages.
Current Claims, PCT/US2005/005498, 14 pages.
International Searching Authority, "Notification of transmittal of the international search report and the written opinion of the international searching authority, or the declaration," International Application No. PCT/US05/18569, dated Oct. 17, 2005, 10 pages.
Current claims, PCT/US05/18569, 7 pages.
International Searching Authority, "Notification of Transmittal of the International Search Report and the Written Opinion of the International Searching Authority, or the Declaration," PCT/US05/20102, dated Oct. 31, 2005, 10 pages.
Current Claims, PCT/US05/20102.
Garreston, "IronPort looks to be E-mail's Guardian", Network World, Sep. 2004, 2 pages.
Avery, Mike, "Networking: Product Reviews: MimeSweeper neatly cleans up e-mail Web Content," Info World Jun. 23, 1997, reproduced by High Beam Research LLC., 3 pages.
Cashramspam.Com, "CashRamSpam.com," file://C:\DOCUME~1\LOCALS~1\temp\2OJL2VHQ.htm, printed Feb. 19, 2003, 9 pages.
"Check Point Firewalls," [Online], retrieved from the internet URL: <http://www.trellisnet.com/Security/Checkpoint/firewalls.asp>, Trellis Network Services, Retrieved on May 18, 2004, pp. 1-3.
"Check Point Signs Technology licensing Agreement with RSA Data Security," Check Point Software Technologies LTD., Sep. 18, 1995, 2 pages.
"Check Point Software technologies to Secure Backweb's Internet Broadcasting Software," Check Point Software Technologies LTD., reproduction of article from Internet World dated Dec. 11, 1996, 2 pages.
"Control Data Systems Partners With Check Point Software To Resell FireWall-1," Check Point Software Technologies LTD., Feb. 21, 1996, 2 pages.
International Searching Authority, "Notification of Transmittal of the International Search Report and the Written Opinion of the International Searching Authority, or the Declaration," PCT/US04/00969, Aug. 18, 2004, 10 pages.
Current Claims in PCT patent application, International Application No. PCT/US03/37417, 16 pages.
Current Claims in International Application, application No. PCT/US04/00969, 19 pages.
International Searching Authority, "Notification of Transmittal of the International Search Report or the Declaration," PCT/US03/37417, Jun. 8, 2004, 7 pages.
Declude, "List of All Known DNS-based Spam Databases," Apr. 20, 2004, http://www.declude.com/Articles.asp?ID=97, data retrieved Jun. 27, 2005, pp. 1-21.
Dwork, Cynthia, et al., "Pricing via Processing or Combatting Junk Mail," Draft of full version, preliminary version of this paper was presented at Crypto '92, pp. 1-11.
eSOFT.COM, "InstaGate EX2—the Firewall with a Future," eSoft Incorporated, 2001, 9 pages.
"eTrust Secure Content Manager," Computer Associates International Inc., 2003, pp. 1-7.
"Fighting Fire with Fire," Computer Reseller News, n757, pp. 143-152, Oct. 6, 1997, 14 pages.

"F-Secure Internet Gatekeeper," F-Secure Data Sheet, F-Secure Corporation, 2 pages.
Google Groups, "MIME mail bombs," Message 1 thread from Selden E. Ball Jr., dated Feb. 28, 1995, 3 pages.
Google Groups, "PMDF and VSWEEP Virus Scanner," Message 1 thread from Eileen Byrne Telecom 617-386-2181, dated Nov. 13, 1995, 2 pages.
Google Groups, "Virus Scanning", Message 1 Thread from John F. Reddington dated Jul. 25, 1995, 5 pages.
Google Groups, "Virus Scanning", Sara.Appleyard, Sep. 8, 1996, 5 pages.
"Integralis Announces MIMEsweeper Compatible with Check Point FireWall-1 on Single NT Server," Checkpoint Software Technologies LTD., Sep. 16, 1996, 2 pages.
Kent, Stephen T., "Internet Privacy Enhanced Email," Communications of the ACM, vol. 36, No. 8, Aug. 1993, pp. 48-60.
Lemos, Robert, "Paying Up for a Spam Seal of Approval," Jun. 24, 2002, http://news.com.com/2100-1001-938976.html, printed Feb. 19, 2003, pp. 1-3.
Mason, Justin, "SpamAssasin Prehistory: filter.plx," [Online], [retrieved on Jun. 20, 2005]. Retrieved from the internet:http://spamassasin.apache.org/prehistory/.
McCullagh, Declan, "Spam Blocker charges for e-mail," CNET Newsc.com, Feb. 19, 2003, Retrieved from <http://www.dotcomeon.com/payformail.htm>, printed Jun. 30, 2005, 2 pages.
MIMEsweeper 2.0 Press Release, "Integralis releases MIMEsweeper Version 2.0 with SMTP mail security support," [online], Jan. 15, 1996, [retrieved on Jun. 8, 2004] Retrieved from the internet: http://web.archive.org/web/19961112103826/www.nha.com/reI20.htm.
MIMEsweeper 2.3 Press Release, "Integralis announces version 2.3 of MIMEsweeper with new email security features," reproduced from Email World, Jun. 13, 1996, 2 pages.
"MIMEsweeper 'Online' SPD," product description for MIMEsweeper [online], [retrieved on Jun. 8, 2004], retrieved from the Internet: http://web.archive.org/web/1996112103244/www.nha.com/msw_onli.htm.
"New Product 'E-Mail Virus Wall' protects companies from e-mail-borne viruses, including new macro viruses," Business Wire, p. 02160157, Feb. 16, 1996, 3 pages.
Nicholas, Nick, "Realtime Blackhole List, Spamware Defined," downloaded on May 27, 2004 from <http://mail-abuse.org/rbl/spamware.htm, 2 pages.
Olawsky, Duane et al., "Developing and Using a 'Policy Neutral' Access Control Policy," Secure Computing Corporation, Dec. 2, 1996, pp. 60-67.
Omniva, "Omniva Policy Manager," Technical White Paper, Ominiva Policy Systems, Jan. 2004, pp. 1-23.
Oppliger, Rolf, "Internet Security; Firewalls and Bey," Communication of the ACM, vol. 40, No. 5, May 1997, pp. 92-102.
Postini Inc., "Postini Perimeter Manager: The Industry's Leading Email Security and Management Solution," Postini Inc., 2004, 4 pages.
"Prevention of Forged-Spam email via Sendmail (Relay Disable)" <http://docsrv.sco.com/MM_admin/mmadminC.spam_forge.html>, Nov. 1999.
"Product Overview—IronMail: The Secure Email Gateway Appliance," CipherTrust, 2 pages.
Prolin, P. et al., "Network Security Probe", Telecom Bretagne, Nov. 1994, pp. 229-240.
"Raptor Systems and Trend Micro to Develop Integrated Firewall/Virus Wall; Security Partnership to Protect Against Unauthorized Access and Viruses," Business Wire, p. 05030072, May 3, 1996, 2 pages.
Rhyolite Software, "Distributed Checksum Clearinghouse," [Online] [Retrieved on Jun. 20, 2005], retrieved from the internet: http://www.rhyolite.com/anti-spam/dcc, pp. 1-5.
Sullivan, Andy "Buffalo Spammer' Sentenced to 3-1/2 to 7 years", U.S. National-Reuters downloaded on May 27, 2004 from <http://news.yahoo.com/news?tmpl=story&u=/nm/20040527/us_nm/tech_spam_dc>, 2 pages.
"Surf Control E-mail Filter," http://www.surfcontrol.com/uploadedfiles/SEF_datasheet.pdf, SurfControl plc., 4 pages.

"Symantic Ships Norton AntiVirus for Internet Email Gateways," PR Newswire, p. 0224SFM068, Feb. 24, 1997, 4 pages.

"The Elm Filter System Guide," CETS Answers, Computing and Educational Technology Services, University of Pennsylvania, Jun. 24, 2003, 8 pages.

"The Elm Filter System Guide, What the Filter Program is, and How to Use It," San Diego State University ROHAN Academic Computing, May 29, 1996, pp. 1-8, available online at http://www-rohan.sdsu.edu/filter.html.

Thorud, G., "Message Handling Systems," Telektronikk, vol. 90, No. 2, 1994, pp. 86-88.

Trend Micro, "Policy-based Antivirus and Content Security for the Messaging Gateway," White Paper, Trend Micro Interscan Messaging Security Suite, Jun. 2002, pp. 1-20.

Trumbo, Jan et al., "Features: Big, Bad E-mail," Network Computing, Oct. 8, 1996, 4 pages, available at http://www.nwc.com/716/716f2.html.

Weisband, Suzanne P. et al., "Managing User Perceptions of Email Privacy," Communications of the ACM, vol. 38, No. 12, Dec. 1995, pp. 40-47.

1997 Press Release, "Trend Micro Sues Integralis for Gateway Anti-VirusPatent Infringement, Seeks to End Sales of E-mail, Internet Gateway Product," Trend Micro, Jul. 8, 1997, 2 pages.

Levine, J., "DNS Based Blacklists and Whitelists for E-Mail", Anti-Spam Research Group, IETF: Apr. 26, 2004, 7 pages.

Andrews, M., "RFC 2308: Negative Caching of DNS Queries", IETF: Mar. 1998, 19 pages.

PCT/US2006/017783 Preliminary Report on Patentability, Published Mar. 19, 2009, Daniel Quinlan, 1-2.

PCT/US2006/017783 Written Opinion of International Searching Authority, Published Mar. 19, 2009, Daniel Quinlan, 3-8.

PCT/US2006/017783 Current Claims, International filing date May 5, 2006, Daniel Quinlan, 1-12.

* cited by examiner

US 7,748,038 B2

METHOD AND APPARATUS FOR MANAGING COMPUTER VIRUS OUTBREAKS

PRIORITY CLAIM AND RELATED APPLICATION

This application claims domestic priority under 35 U.S.C. §119(e) from prior U.S. provisional application Ser. No. 60/580,446, entitled "Method and Apparatus for Managing Computer Virus Outbreaks," filed on Jun. 16, 2004, naming Michael Olivier and Craig Sprosts as inventors, the entire disclosure of which is hereby incorporated by reference for all purposes as if fully set forth herein.

FIELD OF THE INVENTION

The present invention generally relates to computer viruses. The invention relates more specifically to techniques for responding to outbreaks of computer viruses.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The recurring outbreak of message-borne viruses in computers linked to public networks has become a serious problem, especially for business enterprises with large private networks. Direct and indirect costs of thousands of dollars may arise from wasted employee productivity, capital investment to buy additional hardware and software, lost information because many viruses destroy files on shared directories, and violation of privacy and confidentiality because many viruses attach and send random files from a user's computer.

Further, damage from viruses occurs over a very short time period. A very high percentage of machines in an enterprise network can be infected between the time that the virus breaks out and the time virus definitions are published and deployed at an enterprise mail gateway that can detect and stop virus-infected messages. The window of time between "outbreak" and "rule deployment" is often five (5) hours or more. Reducing reaction time would be enormously valuable.

In most virus outbreaks, executable attachments now serve as a carrier of virus code. For example, of 17 leading virus outbreaks in the last three years, 13 viruses were sent through email attachments. Twelve of the 13 viruses sent through email attachments were sent through dangerous attachment types. Thus, some enterprise network mail gateways now block all types of executable file attachments.

Apparently in response, virus writers are now hiding executables. Increasingly, virus writers are hiding known dangerous file types in files that appear to be innocent. For example, a virus writer may embed executables within .zip files of the type generated by WinZIP and other archive utilities. Such .zip files are very commonly used by enterprises to compress and share larger files, so most enterprises are unwilling or unable to block .zip files. It is also possible to embed executables in Microsoft Word and some versions of Adobe Acrobat.

Based on the foregoing, there is a clear need for an improved approach for managing virus outbreaks.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for managing computer virus outbreaks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
      2.1 Network System and Virus Information Sources
      2.2 Counting Suspicious Messages
      2.3 Processing Messages Based on Virus Outbreak Information
      2.4 Generating Virus Outbreak Information
      2.5 Using Virus Outbreak Information
      2.6 Additional Features
      2.7 Example Use Cases
   3.0 Implementation Mechanisms—Hardware Overview
   4.0 Extensions and Alternatives 1.0 General Overview The needs identified in the foregoing Background, and other needs and objects that will become apparent for the following description, are achieved in the present invention, which comprises, in one aspect, a method having the computer-implemented steps of receiving virus outbreak information, wherein the virus outbreak information has been determined by receiving one or more sets of message information for one or more first messages that have one or more characteristics associated with computer viruses, wherein the messages were determined by a virus-check component as not comprising a virus, and mapping the sets of message information received in a specified time period to the virus outbreak information; and when the virus outbreak information indicates initiation of a virus attack, performing a message flow control action for one or more second messages that have the same or similar characteristics associated with computer viruses as the first messages. Thus, early detection of computer viruses is provided by collecting information about suspicious messages and generating virus outbreak information. As a result, a messaging gateway can suspend delivery of messages early in a virus outbreak, providing sufficient time for updating an anti-virus checker that can strip virus code from the messages.

In other aspects, the invention encompasses a computer apparatus and a machine-readable medium configured to carry out the foregoing steps.

Figure 1:
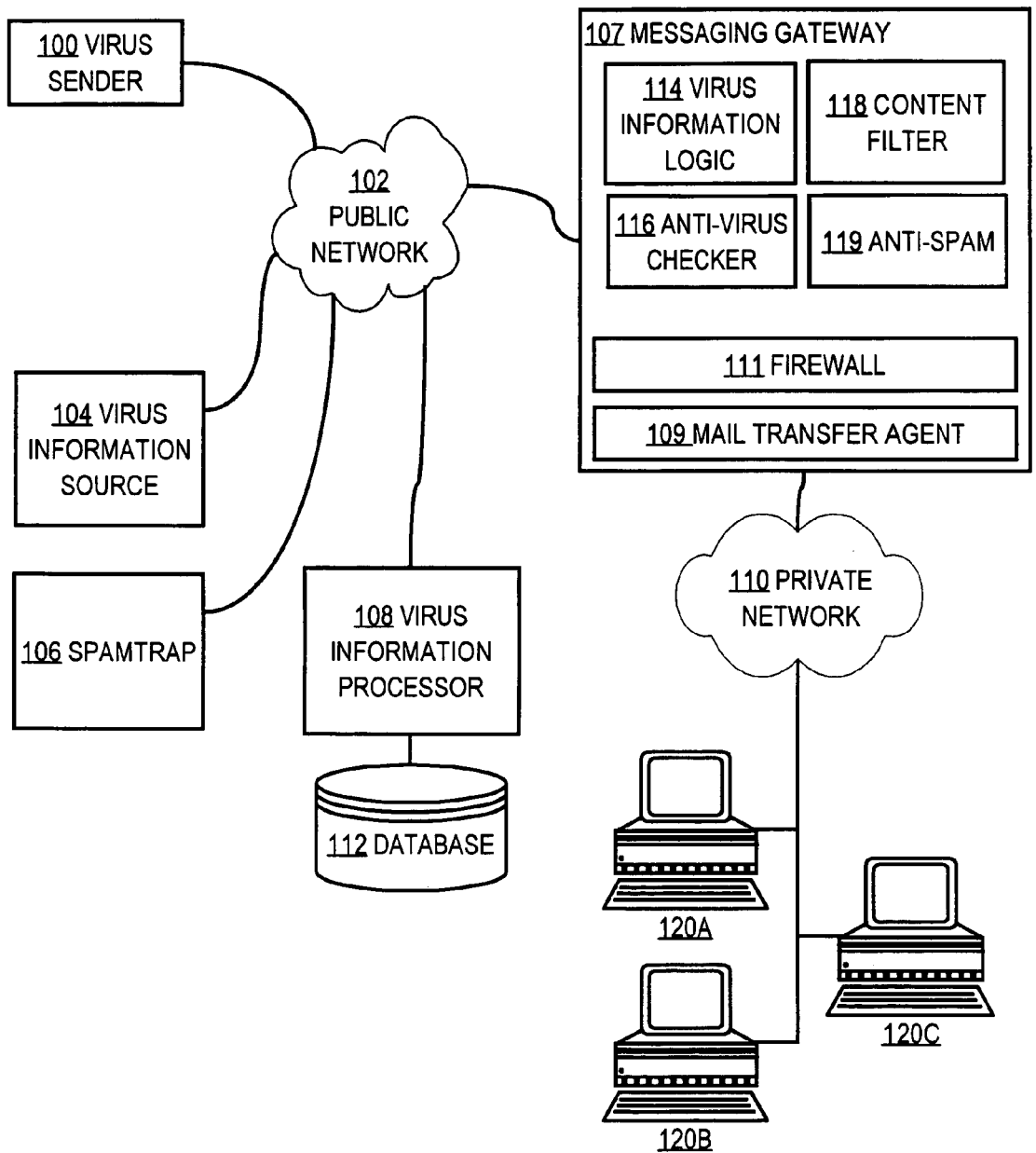
FIG. 1 is a block diagram of a system for managing computer virus outbreaks, according to an embodiment.

2.0 Structural and Functional Overview 2.1 Network System and Virus Information Sources FIG. 1 is a block diagram of a system for managing computer virus outbreaks, according to an embodiment. A virus sender 100, whose identity and location are typically unknown, sends a message infected with a virus, typically in an electronic message, or email, with a virus-bearing executable file attachment, to public network 102, such as the Internet. The message is either addressed to, or propagates by action of the virus to, a plurality of destinations such as virus information source 104 and spamtrap 106. A spamtrap is an email address or an email mailbox used to collect information about unsolicited email messages. The operation and implementation of virus information source 104 and spamtrap 106 is discussed in further detail below. For purposes of illustrating a simple example, FIG. 1 shows only two destinations in the form of virus information source 104 and spamtrap 106, but in a practical embodiment there may be any number of such sources of virus information.

The virus sender 100 may obtain network addresses of virus information source 104 and spamtrap 106 from public sources, or by sending the virus to a small number of known addresses and letting the virus propagate.

A virus information processor 108 is communicatively coupled to public network 102 and can receive information from the virus information source 104 and spamtrap 106. Virus information processor 108 implements certain functions described further herein including collecting virus information from virus information source 104 and spamtrap 106, generating virus outbreak information, and storing the virus outbreak information in a database 112.

A messaging gateway 107 is coupled, directly or indirectly through a firewall 111 or other network elements, from public network 102 to a private network 110 that includes a plurality of end stations 120A, 120B, 120C. Messaging gateway 107 may be integrated with a mail transfer agent 109 that processes email for private network 110, or the mail transfer agent may be deployed separately. For example, an IronPort Messaging Gateway Appliance (MGA), such as model C60, C30, or C10, commercially available from IronPort Systems, Inc., San Bruno, Calif., may implement mail transfer agent 109, firewall 111, and the functions described herein for messaging gateway 107.

In an embodiment, messaging gateway 107 includes virus information logic 114 for obtaining virus outbreak information from virus information processor 108 and processing messages destined for end stations 120A, 120B, 120C according to policies that are set at the messaging gateway. As further described herein, the virus outbreak information can include any of a number of types of information, including but not limited to, a virus score value and one or more rules that associate virus score values with message characteristics that are associated with viruses. As further described herein with respect to FIG. 3, such virus information logic may be integrated with a content filter function of messaging gateway 107.

Messaging gateway 107 may also include an anti-virus checker 116, a content filter 118, and anti-spam logic 119. The anti-virus checker 116 may comprise, for example, Sophos anti-virus software. The content filter 118 provides logic for restricting delivery or acceptance of messages that contain content in a message subject or message body that is unacceptable according to a policy associated with private network 110. The anti-spam logic 119 scans inbound messages to determine if they are unwanted according to a mail acceptance policy, such as whether the inbound messages are unsolicited commercial email, and the anti-spam logic 119 applies policies to restrict delivery, redirect, or refuse acceptance of any unwanted messages.

The private network 110 may be an enterprise network associated with a business enterprise or any other form of network for which enhanced security or protection is desired. Public network 102 and private network 110 may use open standard protocols such as TCP/IP for communication.

Virus information source 104 may comprise another instance of a messaging gateway 107 that is interposed between public network 102 and another private network (not shown for clarity) for purposes of protecting that other private network. In one embodiment, virus information source 104 is an IronPort MGA. Spamtrap 106 is associated with one or more email addresses or email mailboxes associated with one or more domains. Spamtrap 106 is established for the purpose of receiving unsolicited email messages, or "spam," for analysis or reporting, and is not typically used for conventional email communication. For example, a spamtrap can be an email address such as "dummyaccountforspam@mycompany.com," or the spamtrap can be a collection of email addresses that are grouped into a mail exchange (MX) domain name system (DNS) record for which received email information is provided. Mail transfer agent 109, or the mail transfer agent of another IronPort MGA, may host spamtrap 106.

In an embodiment, virus information source 104 generates and provides information to virus information processor 108 for use in managing computer virus outbreaks, and the virus information processor 108 can obtain information from spamtrap 106 for the same purpose. For example, virus information source 104 generates counts of received messages that have suspicious attachments, and provides the counts to virus information processor 108, or allows an external process to retrieve the counts and store them in a specialized database. Messaging gateway 107 also may serve as a virus information source by detecting messages that have indications that are associated with viruses or that are otherwise suspicious, creating a count of suspicious messages received in a particular time period, and periodically providing the count to virus information processor 108.

As a specific example, the functions described herein may be implemented as part of a comprehensive message data collection and reporting facility, such as the SENDERBASE service from IronPort Systems, Inc. In this embodiment, virus information processor 108 can retrieve or receive information from virus information source 104 and spamtrap 106, generate counts of messages that have suspicious attachments or other virus indicators, and update database 112 with the counts and generate virus outbreak information for later retrieval and use by virus information logic 114 of messaging gateway 107. Methods and apparatus relating to the SENDERBASE service are described in co-pending application Ser. No. 10/857,641, filed May 28, 2004, entitled TECH- NIQUES FOR DETERMINING THE REPUTATION OF A MESSAGE SENDER, of Robert Brahms et al., the entire contents of which are hereby incorporated by reference as if fully set forth herein.

Additionally or alternatively, virus information source 104 may comprise the SPAMCOP information service that is accessible at domain "SPAMCOP.net" on the World Wide Web, or users of the SPAMCOP service. Virus information source 104 may comprise one or more Internet service providers or other high-volume mail receivers.

The SENDERBASE and SPAMCOP services provide a powerful data source for detecting viruses. The services track information about millions of messages per day through spamtrap addresses, end-user complaint reporters, DNS logs, and third-party data sources. This data can be used to detect viruses in a rapid manner using the approaches herein. In particular, the number of messages with specific attachment types, relative to normal levels, sent to legitimate or spamtrap addresses, and not identified as viruses by anti-virus scanners, provides an early warning indicator that a virus outbreak has occurred based on a new virus that is not yet known and detectable by the anti-virus scanners.

In another alternative embodiment, as a supplement to the automatic approaches herein, virus information source 104 may comprise the manual review of data that is obtained by information services consultants or analysts, or external sources. For example, a human administrator monitoring alerts from anti-virus vendors, third-party vendors, security mailing lists, spamtrap data and other sources can detect viruses well in advance of when virus definitions are published in most cases.

Once a virus outbreak is identified based on the virus outbreak information, a network element such as messaging gateway 107 can provide various options for handling a message based on the probability that it is a virus. When the messaging gateway 107 is integrated with a mail transfer agent or mail gateway, the gateway can act on this data immediately. For example, the mail transfer agent 109 can delay message delivery into private network 110 until a virus update is received from an anti-virus vendor and installed on messaging gateway 107 so that the delayed messages can be scanned by anti-virus checker 116 after the virus update is received.

Although not shown in FIG. 1, virus information processor 108 can include or be communicatively coupled to a virus outbreak operation center (VOOC), a receiving virus score (RVS) processor, or both. The VOOC and RVS processor can be separate from virus information processor 108 but communicatively coupled to database 112 and public network 102. The VOOC can be implemented as a staffed center with personnel available 24 hours a day, 7 days a week to monitor the information collected by virus information processor 108 and stored in database 112. The personnel staffing the VOOC can take manual actions, such as issuing virus outbreak alerts, updating the information stored in database 112, publishing virus outbreak information so that MGAs can access the virus outbreak information, and manually initiating the sending of virus outbreak information to messaging gateway 107 and other MGAs.

Additionally, the personnel staffing the VOOC may configure the mail transfer agent 109 to perform certain actions, such as delivering a "soft bounce." A soft bounce is performed when the mail transfer agent 109 returns a received message based on a set of rules accessible to the mail transfer agent 109. More specifically, when the mail transfer agent 109 completes a SMTP transaction by accepting an email message from a sender, the mail transfer agent 109 determines, based on a set of stored software rules accessible to the mail transfer agent 109, that the received message is unwanted or undeliverable. In response to the determination that the received message is unwanted or undeliverable, the mail transfer agent 109 returns the message to the bounce email address specified by the sender. When the mail transfer agent 109 returns the message to the sender, the mail transfer agent 109 may strip the message of any attachments.

In some implementations, virus outbreak information is made available, or published, in response to a manual action taken by personnel, such as those staffing the VOOC. In other implementations, virus outbreak information is automatically made available according to the configuration of the virus information processor, VOOC, or RVS, and then the virus outbreak information and the automated actions taken are subsequently reviewed by personnel at the VOOC who can make modifications, if deemed necessary or desirable.

In an embodiment, the staffing personnel at a VOOC or components of a system according to an embodiment may determine whether a message contains a virus based on a variety of factors, such as (a) patterns in receiving messages with attachments, (b) risky characteristics of attachments to received messages, (c) published vendor virus alerts, (d) increased mailing list activity, (e) risky source-based characteristics of messages, (f) the percentage of dynamic network addresses associated with sources of received messages, (g) the percentage of computerized hosts associated with sources of received messages, and (h) the percentage of suspicious volume patterns.

Each of the above factors may include a variety of criteria. For example, the risky characteristics of attachments to received messages may be based on a consideration of how suspicious the filename of the attachment is, whether the file is associated with multiple file extensions, the amount of similar file sizes attached to received messages, the amount of similar file names attached to received messages, and the names of attachments of known viruses. The patterns in receiving messages with attachments may be based on a consideration of the current rate of the number of messages containing attachments, the trend in the number of messages received with risky attachments, and the number of customer data sources, virus information source 104, and spamtraps 106 that are reporting increases in messages with attachments.

In addition, the determination of whether a message contains a virus may be based on information sent from a client, e.g., information may be reported from a user to a system using an email message that is received at the system in a safe environment, such that the message receptor of the system is configured, as best possible, to prevent the spread of a computer virus to other parts of the system if the message receptor is infected with a virus.

The RVS processor can be implemented as an automated system that generates the virus outbreak information, such as in the form of virus score values for various attachment types or in the form of a set of rules that associate virus score values with message characteristics, to be made available to messaging gateway 107 and other MGAs.

2.2 Counting Suspicious Messages

Figure 2:
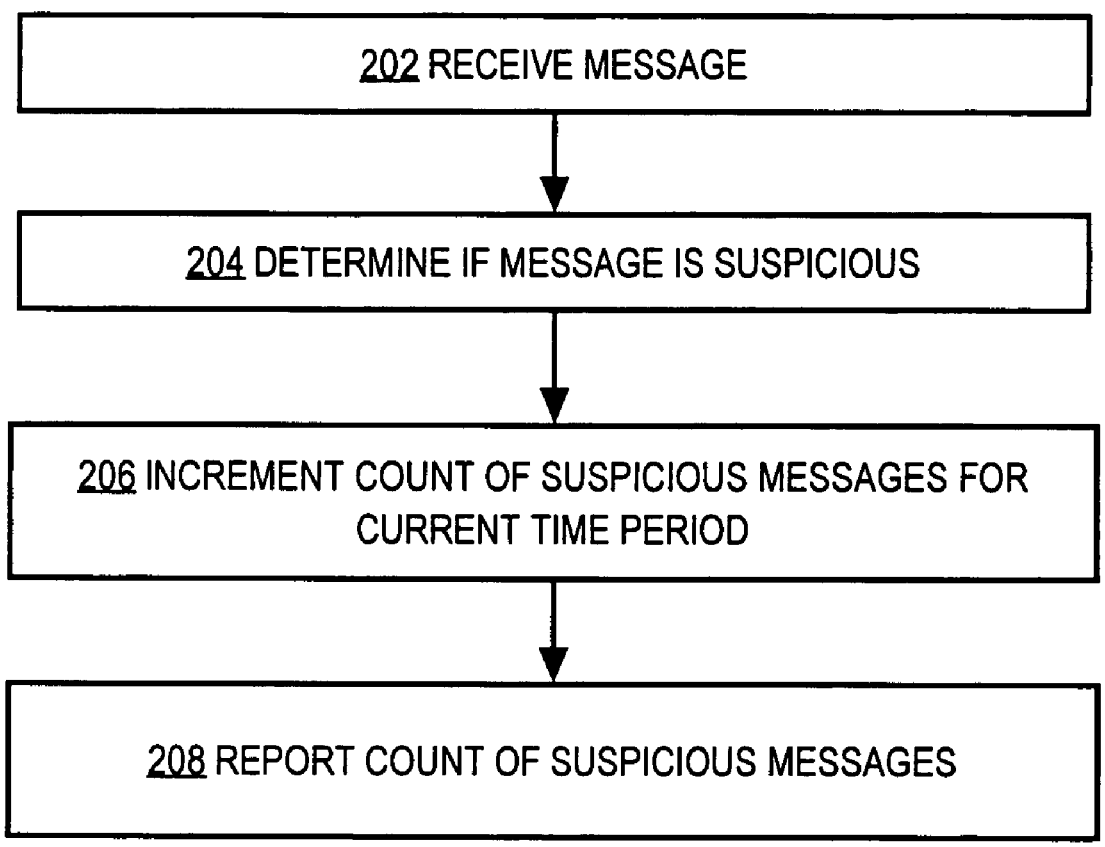
FIG. 2 is a flow diagram of a process of generating a count of suspicious messages, as performed by a virus information source, according to an embodiment.

FIG. 2 is a flow diagram of a process of generating a count of suspicious messages, according to an embodiment. In one implementation, the steps of FIG. 2 may be performed by a virus information source, such as virus information source 104 in FIG. 1.

In step 202, a message is received. For example, virus information source 104 or messaging gateway 107 receives the message sent by virus sender 100.

In step 204, a determination is made about whether the message is risky. In one embodiment, a message is determined to be risky if a virus checker at the virus information source 104 or messaging gateway 107 scans the message without identifying a virus, but the message also includes a file attachment having a file type or extension that is known to be risky. For example, MS Windows (XP Pro) file types or extensions of COM, EXE, SCR, BAT, PIF, or ZIP may be considered risky since virus writers commonly use such files for malicious executable code. The foregoing are merely examples of file types or extensions that can be considered risky; there are more than 50 known different file types.

The determination that a message is suspicious also may be made by extracting a source network address from the message, such as a source IP value, and issuing a query to the SENDERBASE service to determine whether the source is known to be associated with spam or viruses. For example, a reputation score value provided by the SENDERBASE service may be taken into account in determining whether a message is suspicious. A message may also be determined to be suspicious if it was sent from an IP address associated with a host known to be compromised, that has a history of sending viruses, or has only recently started sending email to the Internet. The determination also may be based upon one or more of the following factors: (a) the type or extension of a file attachment that is directly attached to the message, (b) the type or extension of a file that is contained within a compressed file, an archive, a .zip file, or another file that is directly attached to the message, and (c) a data fingerprint obtained from an attachment.

In addition, the determination of suspicious messages can be based on the size of an attachment for a suspicious message, the contents of the subject of the suspicious message, the contents of the body of the suspicious message, or any other characteristic of the suspicious message. Some file types can be embedded with other file types. For example, ".doc" files and ".pdf" files may be embedded with other image files types, such as ".gif" or .bmp". Any embedded file types within a host file type may be considered when determining whether a message is suspicious. The characteristics of the suspicious messages can be used in formulating the rules that are provided or made available to the MGAs and that include the virus score value that is associated with one or more such characteristics.

In step 206, if the message is suspicious, then a count of suspicious messages for the current time period is incremented. For example, if the message has an EXE attachment, a count of messages with EXE attachments is incremented by one.

In step 208, the count of suspicious messages is reported. For example, step 208 may involve sending a report message to the virus information processor 108.

In an embodiment, virus information processor 108 receives numerous reports such as the report of step 208, continuously in real time. As reports are received, virus information processor 108 updates database 112 with report data, and determines and stores virus outbreak information. In one embodiment, the virus outbreak information includes a virus score value that is determined according to a sub-process that is described further with reference to FIG. 4 below.

2.3 Processing Messages Based on Virus Outbreak Information

Figure 3:
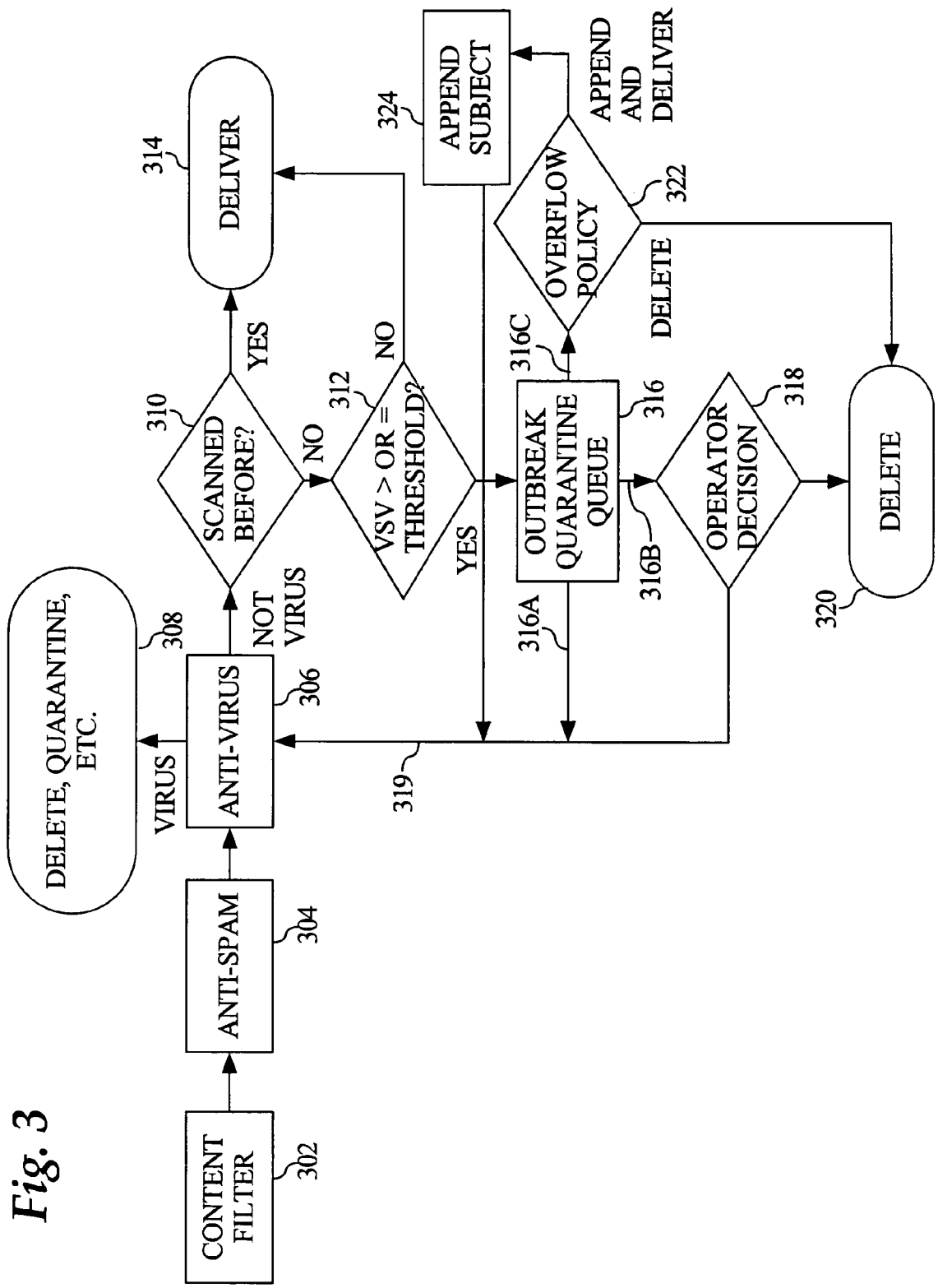
FIG. 3 is a data flow diagram illustrating processing of messages based on virus outbreak information, according to an embodiment.

FIG. 3 is a data flow diagram illustrating processing of messages based on virus outbreak information, according to an embodiment. In one implementation, the steps of FIG. 3 may be performed by an MGA, such as messaging gateway 107 in FIG. 1. Advantageously, by performing the steps illustrated in FIG. 3, a message may be acted upon before it is positively determined to contain a virus.

At block 302, a content filter is applied to the message. Applying a content filter involves, in one embodiment, examining the message subject, other message header values, and the message body, determining whether one or more rules for content filtering are satisfied by the content values, and taking one or more actions when the rules are satisfied, such as may be specified in a content policy. The performance of block 302 is optional. Thus, some embodiments may perform block 302, while other embodiments may not perform block 302.

Further, at block 302 virus outbreak information is retrieved for use in subsequent processing steps. In one embodiment, at block 302 a messaging gateway 107 that implements FIG. 3 can periodically request the then-current virus outbreak information from virus information processor 108. In an embodiment, messaging gateway 107 retrieves the virus outbreak information from the virus information processor 108 approximately every five (5) minutes, using a secure communication protocol that prevents unauthorized parties from accessing the virus outbreak information. If the messaging gateway 107 is unable to retrieve the virus outbreak information, the gateway can use the last available virus outbreak information stored in the gateway.

In block 304, an anti-spam process is applied to the message and messages that appear to be unsolicited messages are marked or processed according to a spam policy. For example, spam messages may be silently dropped, moved to a specified mailbox or folder, or the subject of the message may be modified to include a designation such as "possible spam." The performance of block 304 is optional. Thus, some embodiments may perform block 304, while other embodiments may not perform block 304.

In block 306, an anti-virus process is applied to the message and messages that appear to contain viruses, in the message or in a file attachment, are marked. In one embodiment, anti-virus software from Sophos implements block 306. If a message is determined as positive for a virus, then in block 308, the message is deleted, quarantined, or otherwise processed according to an appropriate virus processing policy.

Alternatively, if block 306 determines that the message is not virus positive, then in block 310, a test is performed to determine whether the message has been scanned for viruses before. As explained further herein, block 306 can be reached again from later blocks after the message has been previously scanned for viruses.

If in block 306 the message has been scanned for viruses before, then the process of FIG. 3 assumes that the anti-virus process 306 has been updated with all patterns, rules, or other information necessary to successfully identify viruses when a virus outbreak has been identified. Therefore, control passes to block 314 in which the message that was scanned before is delivered. If the message is determined in block 310 to not have been scanned before, the process continues to block 312.

In block 312, a test is performed to determine whether the virus outbreak information obtained at block 302 satisfies a specified threshold. For example, if the virus outbreak information includes a virus score value (VSV), the virus score value is checked to see if the virus score value is equal to or greater than a threshold virus score value.

The threshold is specified by an administrator command, in a configuration file, or is received from another machine, process or source in a separate process. In one implementation, the threshold corresponds to the probability that a message contains a virus or is associated with a new virus outbreak. A virus that receives a score above the threshold is subject to the actions specified by an operator, such as performing a quarantine of the message. In some implementations, a single specified threshold is used for all messages, whereas in other implementations, multiple thresholds are used based on different characteristics, so that the administrator can treat some messages more cautiously than others based on the type of messages that the messaging gateway receives and what is considered to be normal or less risky for the associated message recipients. In one embodiment, a default threshold value of 3 is used, based on a virus score scale of 0 to 5, where 5 is the highest risk (threat) level.

For example, the virus outbreak information can include a virus score value, and a network administrator can determine an allowed threshold virus score value and broadcast the threshold virus score value to all message transfer agents or other processors that are performing the process of FIG. 3. As another example, the virus outbreak information can include a set of rules that associate virus score values with one or more message characteristics that are indicative of viruses, and based on the approach described herein with respect to FIG. 5, a virus score value can be determined based on the matching rules for the message.

The value of the threshold virus score value set by the administrator indicates when to initiate delayed delivery of messages. For example, if the threshold virus score value is 1, then a messaging gateway implementing FIG. 3 will delay delivery of messages when the virus score value determined by the virus information processor 108 is low. If the threshold virus score value is 4, then a messaging gateway implementing FIG. 3 will delay delivery of messages when the virus score value determined by the virus information processor 108 is high.

If the specified threshold score value is not exceeded, then in block 314, the message is delivered.

If the threshold virus score value is determined to be exceeded in block 312 and the message has not yet been scanned before as determined in block 310, then the message is placed in an outbreak quarantine queue 316. Each message is tagged with a specified holding time value, or expiration date-time value, representing a period of time during which the message is held in the outbreak quarantine queue 316. The purpose of the outbreak quarantine queue 316 is to delay delivery of messages for an amount of time that is sufficient to enable updating of anti-virus process 306 to account for a new virus that is associated with the detected virus outbreak.

The holding time may have any desired duration. Example holding time values could be between one (1) hour and twenty four (24) hours. In one embodiment, a default holding time value of twelve (12) hours is provided. An administrator may change the holding time at any time, for any preferred holding time value, by issuing a command to a messaging gateway that implements the processes herein. Thus, the holding time value is user-configurable.

One or more tools, features, or user interfaces may be provided to allow an operator to monitor the status of the outbreak quarantine queue and the quarantined messages. For example, the operator can obtain a list of messages currently quarantined, and the list can identify the reason why each message in the queue was quarantined, such as the applicable virus score value for the message that satisfied the specified threshold or the rule, or rules, in a set of rules that matched for the message. Summary information can be provided by message characteristic, such as the types of file attachments, or by the applicable rule if a set of rules are being used. A tool can be provided to allow the operator to review each individual message in the queue. Another feature can be provided to allow the operator to search for quarantined messages that satisfy one or more criteria. Yet another tool can be provided to simulate a message being processed, which can be referred to as "tracing" a message, to make sure that the configuration of the messaging gateway has been correctly performed and that the inbound messages are being properly processed according to the virus outbreak filter.

In addition, a tool can be provided showing general alert information from virus information processor, a VOOC, or an RVS concerning special or significant virus risks or threats that have been identified. Also, tools can be included in the MGA to contact one or more personnel associated with the MGA when alerts are issued. For example, an automated telephone or paging system can contact specified individuals when messages are being quarantined, when a certain number of messages have been quarantined, or when the capacity of the quarantine queue has been filled or has reached a specified level.

A message may exit the outbreak quarantine queue 316 in three ways indicated by paths designated 316A, 316B, 316C in FIG. 3. As shown by path 316A, a message may expire normally when the specified holding time expires for that message. As a result, with normal expiration, in one implementation, the outbreak quarantine queue 316 operates as a FIFO (first in, first out) queue. The message is then transferred back to anti-virus process 306 for re-scanning, on the assumption that after expiration of the holding time, the anti-virus process has been updated with any pattern files or other information necessary to detect viruses that may be in the message.

As indicated by path 316B, a message may be manually released from outbreak quarantine queue 316. For example, in response to a command issued by an administrator, operator, or other machine or process, one or more messages can be released from outbreak quarantine queue 316. Upon a manual release, in block 318 an operator decision to re-scan or delete the message is performed, such as when the operator may have received off-line information indicating that a particular kind of message is definitely virus-infected; in that case, the operator could elect to delete the message at block 320. Alternatively, the operator may have received, before expiration of the holding time value, off-line information indicating that anti-virus process 306 has just been updated with new patterns or other information in response to a virus outbreak. In that case the operator may elect to re-scan the message by sending it back to the anti-virus process 306 for scanning, without waiting for the holding time to expire, as shown by path 319.

As yet another example, the operator can perform a search of the messages currently held in outbreak quarantine queue 316 to identify one or more messages. A message thus identified can be selected by the operator for scanning by anti-virus process 306, such as to test whether anti-virus process 306 has been updated with information sufficient to detect the virus that is involved in the virus outbreak. If the rescan of the selected message is successfully at identifying the virus, the operator can manually release some or all of the messages in outbreak quarantine queue so that the released messages can be rescanned by anti-virus process 306. However, if the virus is not detected by anti-virus process in the selected test message, then the operator can wait until a later time and retest a test message or another message to determine if anti-virus process 306 has been updated to be able to detect the virus, or the operator can wait and let the messages be released when the messages' expiration times expire.

As shown by path 316C, a message also may expire early, for example, because the outbreak quarantine queue 316 is full. An overflow policy 322 is applied to messages that expire early. For example, the overflow policy 322 may require that the message be deleted, as indicated in block 320. As another example, the overflow policy 322 may require that the subject of the message be appended with a suitable warning of the risk that the message is likely to contain a virus, as indicated by block 324. For example, a message such as "MAY BE INFECTED" or "SUSPECTED VIRUS" can be appended to the subject, such as at the end or beginning of the message's subject line. The message with the appended subject is delivered via anti-virus process 306, and because the message has been scanned before, the process continues from anti-virus process 306 through block 310, and the message is then delivered as indicated by block 314.

Additional overflow policies can be applied, although not illustrated in FIG. 3 for clarity. For example, the overflow policy 322 may require removal of file attachments to the message followed by delivery of the message with the file attachments stripped. Optionally, the overflow policy 322 may require stripping only those file attachments that exceed a particular size. As another example, the overflow policy 322 may require that when the outbreak quarantine queue 316 is full, the MTA is allowed to receive a new message, but before the message is accepted during the SMTP transaction, the message is rejected with a 4xx temporary error.

In one embodiment, treatment of a message according to path 316A, 316B, 316C is user configurable for the entire contents of the quarantine queue. Alternatively, such a policy is user configurable for each message.

In an embodiment, block 312 also may involve generating and sending an alert message to one or more administrators when the virus outbreak information obtained from virus information processor 108 satisfies a specified threshold, such as when a virus score value meets or exceeds a specified threshold virus score value. For example, an alert message sent at block 312 may comprise an email that specifies the attachment types for which the virus score has changed, current virus score, prior virus score, current threshold virus score, and when the last update of the virus score for that type of attachment was received from the virus information processor 108.

In yet another embodiment, the process of FIG. 3 may involve generating and sending an alert message to one or more administrators whenever the overall number of messages in the quarantine queue exceeds a threshold set by the administrator, or when a specific amount or percentage of quarantine queue storage capacity has been exceeded. Such an alert message may specify the quarantine queue size, percentage of capacity utilized, etc.

The outbreak quarantine queue 316 may have any desired size. In one embodiment, the quarantine queue can store approximately 3 GB of messages.

2.4 Generating Virus Outbreak Information

In one embodiment, virus outbreak information is generated that indicates the likelihood of a virus outbreak based on one or more message characteristics. In one embodiment, the virus outbreak information includes a numerical value, such as a virus score value. The virus outbreak information can be associated with one or more characteristics of a message, such as the type of attachment with a message, the size of the attachment, the contents of the message (e.g., the content of the subject line of the message or the body of the message), the sender of the message, the IP address or domain of the sender of the message, the recipient of the message, the SENDERBASE service's reputation score for the sender of the message, or any other suitable message characteristic. As a specific example, the virus outbreak information can associate one message characteristic with a virus score value, such as "EXE=4" to indicate a virus score value of "4" for messages with EXE type attachments.

In another embodiment, the virus outbreak information includes one or more rules that each associates the likelihood of a virus outbreak with one or more message characteristics. As a specific example, a rule of the form "if EXE and size<50 k, then 4" indicates that for messages with attachments of type EXE and size less than 50 k, the virus score value is "4." A set of rules can be provided to the messaging gateway to be applied to determine if an inbound message matches the message characteristics of a rule, thereby indicating that the rule is applicable to the inbound message and therefore should be handled based on the associated virus score value. The use of a set of rules is described further with respect to FIG. 5 below.

Figure 4:
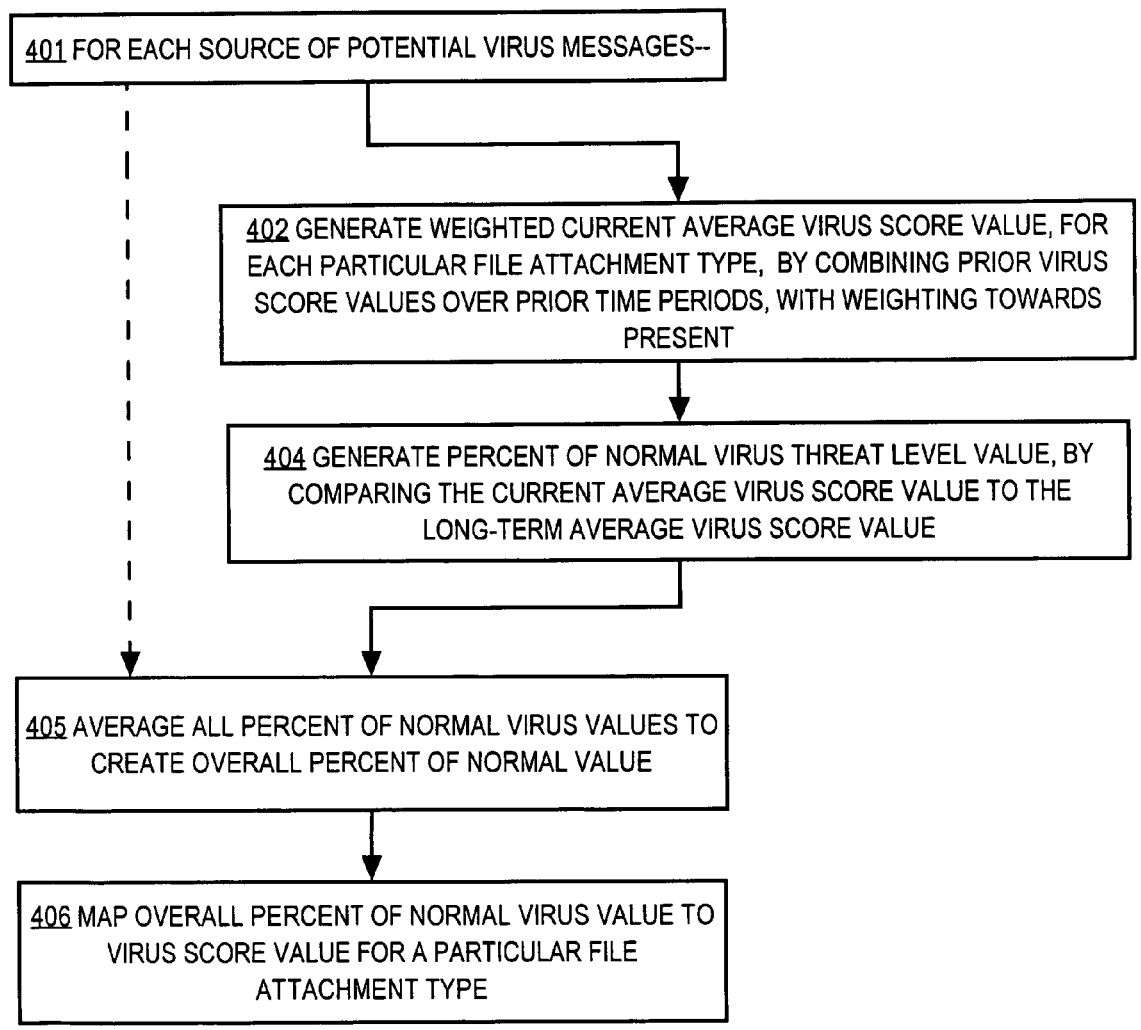
FIG. 4 is a flow diagram of a method of determining a virus score value, according to an embodiment.

FIG. 4 is a flow diagram of a method of determining a virus score value, according to an embodiment. In one implementation, the steps of FIG. 4 may be performed by virus information processor 108 based on information in database 112 received from virus information source 104 and spamtrap 106.

Step 401 of FIG. 4 indicates that certain computational steps 402, 404 are performed for each different source of virus information that is accessible to virus information processor 108, such as virus information source 104 or spamtrap 106.

Step 402 involves generating a weighted current average virus score value, for a particular email file attachment type, by combining one or more prior virus score values for prior time periods, using a weighting approach that accords greater weight for more recent prior virus score values. A virus score value for a particular time period refers to a score value based on the number of messages received at a particular source that have suspicious file attachments. A message is considered to have a suspicious attachment if the attachment satisfies one or more metrics, such as a particular file size, file type, etc., or if the network address of the sender is known to be associated with prior virus outbreaks. The determination may be based on attachment file size or file type or extension.

The determination of the virus score value also may be made by extracting a source network address from the message, such as a source IP address value, and issuing a query to the SENDERBASE service to determine whether the source is known to be associated with spam or viruses. The determination also may be based upon (a) the type or extension of a file attachment that is directly attached to the message, (b) the type or extension of a file that is contained within a compressed file, an archive, a .zip file, or another file that is directly attached to the message, and (c) a data fingerprint obtained from an attachment. A separate virus score value may be generated and stored for each attachment type found in any of the foregoing. Further, the virus score value may be generated and stored based upon the most risky attachment type found in a message.

In one embodiment, step 402 involves computing a combination of virus score values for the last three 15-minute periods, for a given file attachment type. Further, in one embodiment, a weighting value is applied to the three values for the 15-minute periods, with the most recent 15-minute time period being weighted more heavily than earlier 15-minute time periods. For example, in one weighting approach, a multiplier of 0.10 is applied to the virus score value for the oldest 15-minute period (30-45 minutes ago), a multiplier of 0.25 is applied to the second-oldest value (15-30 minutes ago), and a multiplier of 0.65 is applied to the most recent virus score value for the period 0-15 minutes ago.

In step 404, a percent-of-normal virus score value is generated for a particular file attachment type, by comparing the current average virus score value determined at step 402 to a long-term average virus score value. The current percent of normal level may be computed with reference to a 30-day average value for that file attachment type over all 15-minute time periods within the 30-day period.

In step 405, all of the percent-of-normal virus score values for all sources, such as virus information source 104 and spamtrap 106, are averaged to result in creating an overall percent-of-normal value for a particular file attachment type.

In step 406, the overall percent-of-normal value is mapped to a virus score value for a particular file attachment type. In one embodiment, the virus score value is an integer between 0-5, and the overall percent-of-normal value is mapped to a virus score value. Table 1 presents an example of a virus score scale.

TABLE 1

Example Virus Score Scale

| Percent of normal | Score | Level of Threat |
|---|---|---|
| 0-150 | 0 | No known threat/very low threat |
| 150-300 | 1 | Possible threat |
| 300-900 | 2 | Small threat |
| 900-1500 | 3 | Moderate threat |
| >1500 | 4 | High threat/extremely risky |

In other embodiments, mappings to score values of 0 to 100, 0 to 10, 1 to 5, or any other desired range of values may be used. In addition to integer score values, non-integer values can be used. Instead of using a defined range of values, a probability value can be determined, such as a probability in the range of 0% to 100% in which the higher probabilities indicate a stronger likelihood of a virus outbreak, or such as a probability in the range of 0 to 1 in which the probability is expressed as a fraction or decimal, such at 0.543.

As an optimization, and to avoid division by zero issues that may occur with very low 30-day counts, the process of FIG. 4 can add one to the baseline averages computed in step 402. In essence, adding one raises the noise level of the values slightly in a beneficial way, by dampening some of the data.

Table 2 presents example data for the EXE file type in a hypothetical embodiment:

TABLE 2

Example data for ".exe" file type:

| Source | 30-day average | Current ".exe" counts, 45 min., 30 min., 15 min. ago | Current average | Current ".exe" as % of normal |
|---|---|---|---|---|
| Source 1 | 3.6 | 21, 40, 3 | 14 | 382% |
| Source 2 | 15.4 | 50, 48, 7 | 21.6 | 140% |
| Source 3 | 1.7 | 1, 1, 15 | 10.1 | 600% |
| Source 4 | 1.3 | 15, 15, 15 | 15 | 1200% |
| Average % of normal | | | | 581% |
| Virus Score | | | | 2 |

In an alternative embodiment, the processes of FIG. 2, FIG. 3, FIG. 4 also may include logic to recognize trends in the reported data and identify anomalies in virus score computations.

Since the majority of executables are spread through one type of email attachment or another, the strategy of the approaches herein focuses on making policy decisions based on attachment type. In an alternative embodiment, a virus score value could be developed by considering other message data and metadata, such as Universal Resource Locators (URLs) in a message, the name of a file attachment, source network address, etc. Further, in an alternative embodiment, a virus score value may be assigned to individual messages rather than to file attachment types.

In yet another embodiment, other metrics may be considered to determine the virus score value. For example, if a large number of messages are suddenly received from new hosts that have never sent messages to virus information processor 108 or its information sources before, a virus may be indicated. Thus, the fact that the date that a particular message has been first seen is recent, and a spike in message volume detected by virus information processor 108, may provide an early indication of a virus outbreak.

2.5 Using Virus Outbreak Information

As described above, virus outbreak information can simply associate a virus score value with a message characteristic, such as an attachment type, or virus outbreak information can include a set of rules that each associates a virus score value with one or more characteristics of messages that are indicative of viruses. An MGA can apply the set of rules to incoming messages to determine which rules match a message. Based on the rules that match an incoming message, the MGA can determine the likelihood that the message includes a virus, such as by determining a virus score value based on one or more of the virus score values from the matching rules.

For example, a rule can be "if 'exe', then 4" to denote a virus score of 4 for messages with EXE attachments. As another example, a rule can be "if 'exe' and size<50 k, then 3" to denote a virus score of 3 for messages with EXE attachments with a size of less than 50 k. As yet another example, a rule can be "if SBRS <−5, then 4" to denote a virus score of 4 if the SENDERBASE service's Reputation Score (SBRS) is less than "−5". As another example, a rule can be "if TIF' and subject contains FOOL, then 5" to denote a virus score of 5 if the message has a PIF type of attachment and the subject of the message includes the string "FOOL." In general, a rule can associate any number of message characteristics or other data that can be used to determine a virus outbreak with an indicator of the likelihood that a message matching the message characteristics or other data includes a virus.

Furthermore, a messaging gateway can apply exceptions, such as in the form of one or more quarantine policies, to determine whether a message, which otherwise satisfies the specified threshold based on the virus score value determined based on the matching rules, such as is determined in block 312 of FIG. 3, is to be placed into the outbreak quarantine queue or whether the message is to be processed without being placed into the outbreak quarantine queue. The MGA can be configured to apply one or more policies for applying the rules, such as a policy to always allow messages to be delivered to an email address or group of email addresses regardless of the virus scores, or to always deliver messages with a specified type of attachment, such as ZIP files containing PDF files.

In general, by having the virus information processor supply rules instead of virus score values, each MGA can apply some or all of the rules in a manner determined by the administrator of the MGA, thereby providing additional flexibility to meet the needs of the particular MGA. As a result, even if two MGAs use the same set of rules, the ability to configure the application of the rules by the administrator of each MGA means that each MGA can process the same message and obtain a different result in terms of the determined likelihood that a virus attack is occurring, and each MGA can process the same message and take different actions, depending on the configuration established by the administrator for the MGA.

Figure 5:
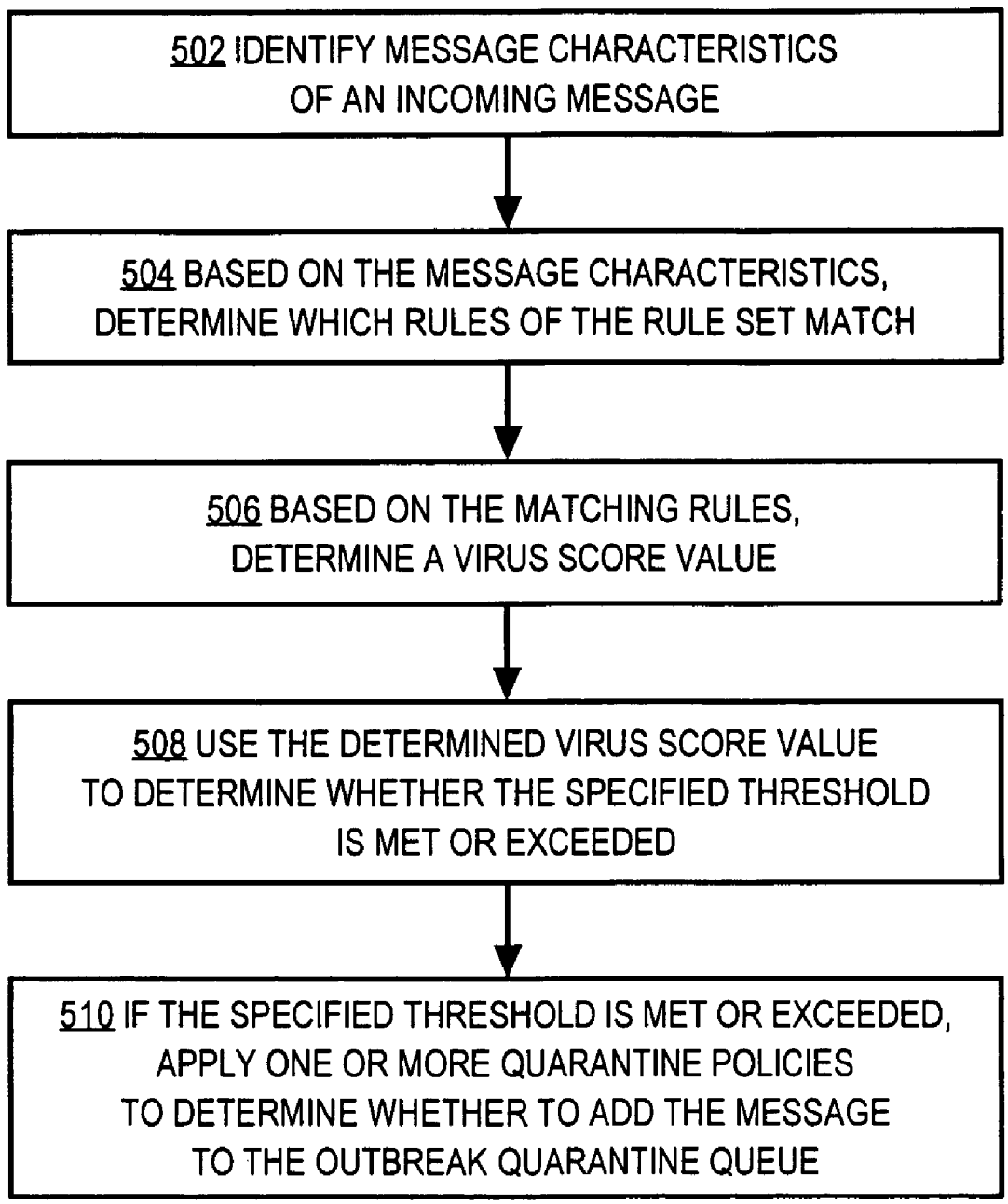
FIG. 5 is a flow diagram illustrating application of a set of rules for managing virus outbreaks according to an embodiment.

FIG. 5 is a flow diagram illustrating application of a set of rules for managing virus outbreaks, according to an embodiment. The functions illustrated in FIG. 5 can be performed by the messaging gateway as part of block 312 or at any other suitable position during the processing of the incoming message.

In block 502, the messaging gateway identifies the message characteristics of an incoming message. For example, messaging gateway 107 can determine whether the message has an attachment, and if so, the type of attachment, the size of the attachment, and the name of the attachment. As another example, messaging gateway 107 can query the SENDERBASE service based on the sending IP address to obtain a SENDERBASE service's reputation score. For the purposes of describing FIG. 5, assume that that message has an EXE type of attachment with a size of 35 k and that sending host for the message has a SENDERBASE service's reputation score of −2.

In block 504, the messaging gateway determines which rules of the rule set are matched based on the message characteristics for the message. For example, assume that for the purposes of describing FIG. 5, the rule set consists of the following five rules that associate the example characteristics with the provided hypothetical virus score values:

Rule 1: "if EXE, then 3"
Rule 2: "if ZIP, then 4"
Rule 3: "if EXE and size>50 k, then 5"
Rule 4: "if EXE and size<50 k and size>20 k, then 4"
Rule 5: "if SBRS <−5, then 4"

In these example rules, Rule 1 indicates that ZIP attachments are more likely to include a virus than EXE attachments because the virus score is 4 in Rule 2 but only 3 in Rule 1. Furthermore, the example rules above indicate that EXE attachments with a size of greater than 50 k are the most likely to have a virus, but EXE attachments with a size of less than 50 k but greater than 20 k are a little less likely to include a virus, perhaps because most of the suspicious messages with EXE attachments are greater than 50 k in size.

In the present example in which the message has an EXE type of attachment with a size of 35 k and the associated SENDERBASE service's reputation score is −2, Rules 1 and 4 match while Rules 2, 3, and 5 do not match.

In block 506, the messaging gateway determines a virus score value to be used for the message based on the virus score values from the matching rules. The determination of the virus score value to be used for the message can be performed based on any of a number of approaches. The particular approach used can be specified by the administrator of the messaging gateway and modified as desired.

For example, the rule that is matched first when applying the list of rules in the order listed can be used, and any other matching rules are ignored. Thus, in this example, the first rule to match is Rule 1, and therefore the virus score value for the message is 3.

As another example, the matching rule with the highest virus score value is used. Thus, in this example, Rule 3 has the highest virus score value among the matching rules, and therefore, the virus score value for the message is 5.

As yet another example, the matching rule with the most specific set of message characteristics is used. Thus, in this example, Rule 4 is the most specific matching rule because Rule 4 includes three different criteria, and therefore the virus score value for the message is 4.

As another example, virus score values from the matching rules can be combined to determine the virus score value to apply to the message. As a specific example, the virus score values from Rules 1, 3, and 4 can be averaged to determine a virus score value of 4 (e.g., $(3+4+5) \div 3 = 4$). As another example, a weighted average of the virus score values of the matching rules can be used, so as to give more weight to the more specific rules. As a specific example, the weight for each virus score value can be equal to the number of criteria in the rule (e.g., Rule 1 with one criterion has a weight of 1 while Rule 4 with three criteria has a weight of 3), and thus the weighted average of Rule 1, 3, and 4 results in a virus score value of 4.2 (e.g., $(1*3+2*5+3*4) \div (1+2+3) = 4.2$).

In block 508, the messaging gateway uses the virus score value determined in block 506 to determine whether the specified threshold virus score value is satisfied. For example, assume that in this example the threshold is a virus score value of 4. As a result, the virus score value determined in block 506 by all the example approaches would satisfy the threshold value, except for the first example that uses the first rule to match and for which block 506 determines the virus score value to be 3.

If the specified threshold is determined to be satisfied by the virus score value determined in block 508, then in block 510 one or more quarantine policies are applied to determine whether to add the message to the outbreak quarantine queue. For example, the administrator of the messaging gateway may determine that one or more users or one or more groups of users should never have their messages quarantined even if a virus outbreak has been detected. As another example, the administrator can establish a policy that messages with certain characteristics (e.g., messages with XLS attachments with a size of at least 75 k) are to always be delivered instead of being quarantined when the virus outbreak information indicates a virus attack based on the specified threshold.

As a specific example, the members of the organizations legal department may frequently receive ZIP files containing important legal documents that should not be delayed by being placed in the outbreak quarantine, even if the messaging gateway determines that a virus outbreak is occurring. Thus, the mail administrator for the messaging gateway can establish a policy to always deliver messages with ZIP attachments to the legal department, even if the virus score value for ZIP attachments meets or exceeds the specified threshold.

As another specific example, the mail administrator may wish to always have messages delivered that are addressed to the email address for the mail administrator, since such messages could provide information for dealing with the virus outbreak. Given that the mail administrator is a sophisticated user, the risk in delivering a virus infected message is low since the mail administrator will likely be able to identify and deal with an infected message before the virus can act.

For the example being used in describing FIG. 5, assume that the mail administrator has established a policy that EXE attachments addressed to the company's senior engineering managers are to always be delivered, even if the virus score value for such messages meets or exceeds a threshold virus score value. Thus, if the message is addressed to any of the senior engineering managers, the message is nevertheless delivered instead of being placed into the outbreak quarantine. However, messages addressed to others besides the senior engineering manages are quarantined (unless otherwise excluded by another applicable policy).

In one embodiment, the messaging gateway can be configured to be in one of two states: "calm" and "nervous." The calm state applies if no messages are being quarantined. However, when virus outbreak information is updated and indicates that a specified threshold is exceeded, the state changes from calm to nervous, regardless of whether any messages being received by the messaging gateway are being quarantined. The nervous state persists until the virus outbreak information is updated and indicates that the specified threshold is not longer exceeded.

In some implementations, an alert message is sent to an operator or administrator whenever a change in the system state occurs (e.g., calm to nervous or nervous to calm). In addition, alerts can be issued when a previously low virus score value that did not satisfy the threshold now does meet or exceed the threshold, even if the overall state of the system does not change (e.g., the system previously changed from calm to nervous, and while in the nervous state, another virus score was received from the virus information processor that also meets or exceeds the threshold). Similarly, an alert can be issued when a previously high virus score that did satisfy the threshold has dropped and now is less than the specified threshold.

Alert messages can include one or more types of information, including but not limited to, the following: the attachment type for which the virus outbreak information changed, the current virus score, the prior virus score, the current threshold, and when the last update for the virus outbreak information occurred.

2.6 Additional Features

One or more of the following additional features can be used in a particular implementation, in addition to the features described above.

One additional feature is to obtain sender-based data that is specifically designed to aid in the identification of virus threats. For example, when an MGA queries a service such as the SENDERBASE service to obtain the SENDERBASE service's reputation score for the connecting IP address, the SENDERBASE service can provide virus threat data that is specific for the connecting IP address. The virus threat data is based on data collected by the SENDERBASE service for the IP address and reflects the history of the IP address in terms of how often viruses are detected in messages originating from the IP address or the company associated with the IP address. This can allow the MGA to obtain a virus score from the SENDERBASE service based solely on the sender of the message without any information or knowledge about the content of a particular message from the sending IP address. The data on the virus threat for the sender can be used in place of, or in addition to, a virus score as determined above, or the data on the virus threat for the sender can be factored into the calculation of the virus score. For example, the MGA could increase or decrease a particular virus score value based on the virus threat data for the sender.

Another feature is to use a dynamic or dial-up blacklist to identify messages that are likely infected with a virus when a dynamic or dial-up host connects directly to an external SMTP server. Normally, dynamic and dial-up hosts that connect to the Internet are expected to send outgoing messages through the hosts' local SMTP server. However, if the host is infected with a virus, the virus can cause the host to connect directly to an external SMTP server, such as an MGA. In such a situation, the likelihood that the host is infected with a virus that is causing the host to establish the direct connection to the external SMTP server is high. Examples include spam and open relay blocking system (SORBS) dynamic hosts and not just another bogus list (NJABL) dynamic hosts.

However, in some cases, the direct connection is not virus initiated, such as when a novice user is making the direct connection or when the connection is from a broadband host that is not dynamic, such as DSL or cable modems. Nevertheless, such direct connections from a dial-up or dynamic host to an external SMTP server can result in determining a high virus score or increasing an already determined virus score to reflect the increased likelihood that the direct connection is due to a virus.

Another feature is to use as a virus information source an exploited host blacklist that track hosts that have been exploited by viruses in the past. A host can be exploited when the server is an open relay, an open proxy or has another vulnerability that allows anybody to deliver email to anywhere. Exploited host blacklists track exploited hosts using one of two techniques: the content that infected hosts are sending and locating hosts that have been infected via connect-time scanning. Examples include the Exploits Block List (XBL), which uses data from the Composite Blocking List (CBL) and the Open Proxy Monitor (OPM), and the Distributed Server Boycott List (DSBL).

Another feature is for the virus information processor to develop a blacklist of senders and networks that have a past history of sending viruses. For example, the highest virus score can be assigned to individual IP addresses that are known to send only viruses. Moderate virus scores can be associated with individual IP addresses that are known to send both viruses and legitimate messages that are not virus infected. Moderate to low virus scores can be assigned to networks that contain one or more individual infected hosts.

Another feature is to incorporate a broader set of tests for identifying suspicious messages in addition to those discussed above, such as identifying attachment characteristics. For example, a generic header test can be used to test on any generic message header to look for either a fixed string or a regular expression, such as in the following examples:

head X_MIME_FOO X-Mime=~/foo/ head SUBJECT_YOUR Subject=~/your document/

As another example, a generic body test can be used to test the message body by searching for a fixed string or a regular expression, such as in the following examples:

body HEY_PAL /hey pal|llong time, no see/ body ZIP_PASSWORD /\.zip password is/i

As yet another example, a function test can be used to craft custom tests to test very specific aspects of a message, such as in the following examples:

eval EXTENSION_EXE message_attachment_ext(".exe")

eval MIME_BOUND_FOO mime_boundary("—/d/d/d/d[a-f]")

eval XBL_IP connecting_ip(exploited host)

As another example, a meta test can be used to build on multiple features, such as those above, to create a meta rule of rules, such as in the following examples:

meta VIRUS_FOO ((SUBJECT_FOO1 || SUBJECT_FOO2) && BODY_FOO)

meta VIRUS_BAR (SIZE_BAR+SUBJECT_BAR+BODY_BAR>2)

Another feature that can be used is to extend the virus score determination approach above to one or more machine learning techniques so that not all rules need to be run and to provide accurate classification by minimizing false positives and false negatives. For example, one or more of the following methods can be employed: a decision tree, to provide discrete answers; perception, to provide additive scores; and Bayes-like analysis, to map probabilities to scores.

Another feature is to factor into the virus score determination the severity of the threat from a virus outbreak based on the consequences of the virus. For example, if the virus results in the infected computer's hard drive having all its contents deleted, the virus score can be increased, whereas a virus that merely displays a message can have the virus score left unchanged or even reduced.

Another additional feature is to expand the options for handling suspicious messages. For example, a suspicious message can be tagged to indicate that the message is suspicious, such as by adding to the message (e.g., in the subject or body) the virus score so that the user can be alerted to the level of virus risk determined for the message. As another example, a new message can be generated to either alert the recipient of the attempt to send to them a virus infected message or to create a new and uninfected message that includes the non-virus infected portions of the message.

2.7 Example Use Cases

The following hypothetical descriptions provide examples of how the approaches described herein may be used to manage virus outbreaks.

As a first use case, assume that a new virus entitled "Sprosts.ky" is spread through a Visual Basic macro embedded in Microsoft Excel. Shortly after the virus hits, the virus score moves from 1 to 3 for .xls attachments, and a user of the approaches herein, Big Company, starts delaying the delivery of Excel files. The network administrator for Big Company receives an email stating that .xls files are now quarantined. Sophos then sends out an alert an hour later stating that a new update file is available to stop the virus. The network administrator then confirms that his IronPort C60 has the latest update file installed. Although the network administrator had set the delay period to 5 hours for the quarantine queue, Excel files are critical to the company, so the administrator cannot afford to wait another four hours. Therefore, the administrator accesses the IronPort C60 and manually flushes the queue, sending all messages with Excel files attached through Sophos anti-virus checking. The administrator finds that 249 of these messages were virus positive, and 1 was not caught by Sophos, because it wasn't infected. The messages are delivered with a total delay of 1½ hours.

As a second use case, assume that a "Clegg.P" virus is spread through encrypted .zip files. The network administrator at Big Company receives an email alert that the virus score value has jumped, but the administrator ignores the alert, relying on automatic processing as provided herein. Six hours later, overnight, the administrator receives a second page alerting him that the quarantine queue has reached 75% of capacity. By the time the administrator arrives at work, Clegg.P has filled Big Company's quarantine queue. Fortunately, the network administrator had set policies on the IronPort C60 to deliver messages as normal when the quarantine queue overflowed, and Sophos had come out with a new update overnight, before the quarantine queue overflowed. Only two users were infected prior to the virus score value triggering the quarantine queue, so the administrator is faced only with an over-filled quarantine queue. The administrator flushes the messages from the queue, automatically deleting them to spare load on the IronPort C60, on the assumption that all the messages were viruses. As a preventive approach, the network admin starts blocking all encrypted .zip files for a specified future time period.

3.0 Implementation Mechanisms—Hardware Overview

The approach for managing computer virus outbreaks described herein may be implemented in a variety of ways and the invention is not limited to any particular implementation. The approach may be integrated into a electronic mail system or a mail gateway appliance or other suitable device, or may be implemented as a stand-alone mechanism. Furthermore, the approach may be implemented in computer software, hardware, or a combination thereof.

Figure 6:
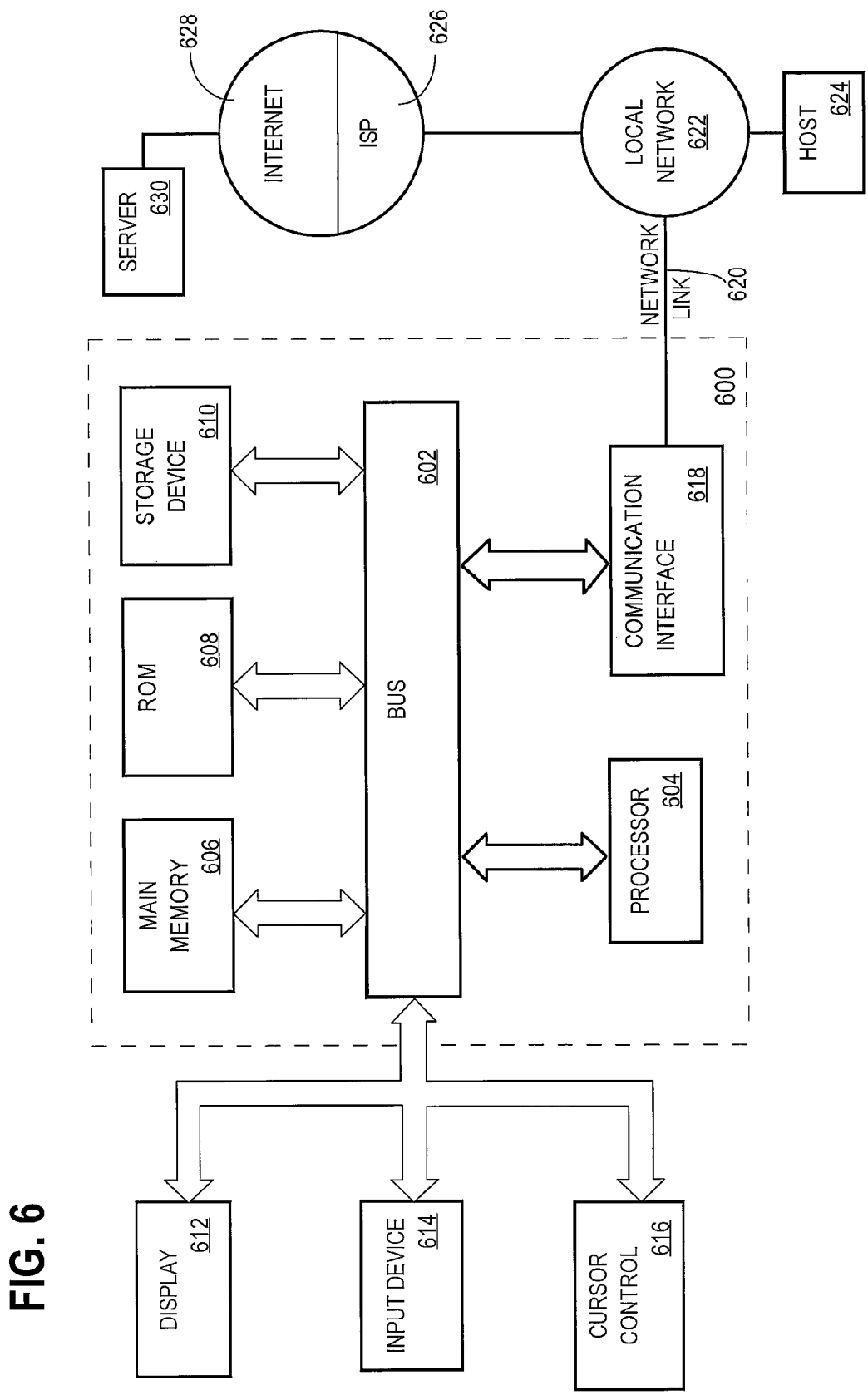
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for managing computer virus outbreaks. According to one embodiment of the invention, managing computer virus outbreaks is provided by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 604 for execution. Such a medium may take many forms, including but not limited to, non-volatile media, and volatile media. Non-volatile media includes, for example, optical or magnetic disks, such as storage device 610. Volatile media includes dynamic memory, such as main memory 606.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for managing computer virus outbreaks as described herein.

Processor 604 may execute the received code as it is received, and/or stored in storage device 610, or other non-volatile storage for later execution. In this manner, computer system 600 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The invention includes other contexts and applications in which the mechanisms and processes described herein are available to other mechanisms, methods, programs, and processes.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A method, comprising the computer-implemented steps of:

receiving one or more sets of message information for one or more first messages that are suspected to be associated with computer viruses;

sending the one or more sets of message information to a virus-check component to determine whether the one or more first messages comprise one or more viruses;

receiving an indication from the virus-check component that the one or more first messages do not comprise any viruses;

in response to receiving the indication that the one or more first messages do not comprise any viruses and that the one or more first messages was sent from a source not known to be associated with viruses but that sent a large number of messages according to a message sending pattern suspected to be associated with computer viruses and comprising at least one attachment, and based on mapping the one or more sets of message information received in a specified time period to virus outbreak information by generating a current average virus score value by combining one or more prior virus score values associated with respective one or more prior time periods, generating a percent-of-normal virus score value by comparing the current average virus score value with a long-term average virus score value and mapping the percent-of-normal virus score value to a range of virus score values, determining that the one or more first messages do comprise one or more viruses; and in response to the determining that the one or more first messages do comprise one or more viruses, performing a message flow control action for one or more second messages that are also suspected to be associated with computer viruses as the one or more first messages;

wherein the method is performed by one or more processors.

2. A method as recited in claim 1, wherein the virus score value is associated with a particular message, and wherein the virus score value is determined based on the mapping step.

3. A method as recited in claim 2, wherein the virus score value is determined without examining the contents of any attachment to the particular message.

4. A method as recited in claim 1, wherein the virus outbreak information includes one or more rules that each associates a virus score value with one or more first messages suspected to be associated with computer viruses.

5. A method as recited in claim 4, wherein each rule applies to one or more second messages that are suspected to be associated with computer viruses.

6. A method as recited in claim 5, wherein the virus outbreak information includes at least two rules that apply to a particular second message of the one or more second messages, and the virus outbreak information indicates initiation of the virus attack based on a highest virus score value from among the virus score values for the at least two rules.

7. A method as recited in claim 1, wherein the one or more first messages are suspected to be associated with computer viruses if the one or more first messages have file attachments having a file type associated with computer viruses.

8. A method as recited in claim 7, wherein the file type is any of EXE, ZIP, COM, SCR, BAT, and PIF.

9. A method as recited in claim 1, wherein receiving one or more sets of message information comprises receiving at least one set of message information from a spamtrap.

10. A method as recited in claim 1, wherein receiving one or more sets of message information comprises receiving, from one or more spamtraps, one or more counts of messages that are suspected to be associated with computer viruses, wherein the messages were determined by the virus-check component as not comprising a virus.

11. A method as recited in claim 1, wherein the virus outbreak information indicates initiation of the virus attack when the virus outbreak information satisfies a specified relationship with a specified threshold.

12. A method as recited in claim 1, wherein for each of a plurality of file attachment types of the one or more first messages to result in generating a plurality of percent-of-normal virus score values respectively associated with each of the plurality of file attachment types.

13. A method as recited in claim 12, further comprising computing an average of all the plurality of percent-of-normal virus score values to create an overall percent-of-normal value, and mapping the overall percent-of-normal value to the range of virus score values, to result in creating a particular virus score value for a particular file attachment type.

14. A method as recited in claim 1, wherein the message flow control action comprises delaying delivery of the one or more second messages for a specified time.

15. A method as recited in claim 14, wherein the message flow control action further comprises releasing the one or more second messages upon expiration of the specified time and then scanning the one or more second messages for viruses prior to delivery.

16. A method as recited in claim 1, wherein the message flow control action comprises storing the one or more second messages in a quarantine queue for a specified time.

17. A method as recited in claim 16, wherein the message flow control action further comprises releasing the one or more second messages upon expiration of the specified time and then scanning the one or more second messages for viruses prior to delivery.

18. A method as recited in claim 16, wherein the message flow control action further comprises applying an overflow policy when the quarantine queue is full.

19. A method as recited in claim 18, wherein the overflow policy comprises stripping any attachments from the one or more second messages and then delivering the one or more second messages without the attachments.

20. A method as recited in claim 18, wherein the overflow policy comprises releasing the one or more second messages and then scanning the one or more second messages for viruses prior to delivery.

21. A method as recited in claim 18, wherein the overflow policy comprises appending a warning indication to a subject of the one or more second messages and then scanning the one or more second messages for viruses prior to delivery.

22. A method as recited in claim 16, further comprising the steps of:
receiving user input requesting deletion of the one or more second messages in the quarantine queue; and
deleting the one or more second messages in the quarantine queue in response to the user input.

23. A method as recited in claim 16, further comprising the steps of:
receiving user input requesting release of the one or more second messages from the quarantine queue; and
releasing the one or more second messages and then scanning the one or more second messages for viruses prior to delivery.

24. A method as recited in claim 16, further comprising the steps of:
receiving user input requesting a rescan for virus of a particular second message of the one or more second messages from the quarantine queue; and
based on the particular second message not comprising a virus, releasing the one or more second messages and then scanning the one or more second messages for viruses prior to delivery.

25. A method as recited in claim 1, wherein the message flow control action comprises not delaying delivery of a particular second message because the particular second message is addressed to a recipient for whom message delivery has been specified to performed even if the virus outbreak information indicates initiation of a virus attack.

26. A method, comprising the computer-implemented steps of:
receiving one or more sets of message information for one or more first messages that are suspected to be associated with computer viruses;
sending the one or more sets of message information to a virus-check component to determine whether the one or more first messages comprise one or more viruses;
receiving an indication from the virus-check component that the one or more first messages do not comprise any viruses;
in response to receiving the indication that the one or more first messages do not comprise any viruses and that the one or more first messages was sent from a source not known to be associated with viruses but that sent a large number of messages according to a message sending pattern suspected to be associated with computer viruses and comprising at least one attachment, and based on mapping the one or more sets of message information received in a specified time period to virus outbreak information by generating a current average virus score value by combining one or more prior virus score values associated with respective one or more prior time periods, generating a percent-of-normal virus score value by comparing the current average virus score value with a long-term average virus score value and mapping the percent-of-normal virus score value to a range of virus score values, determining that the one or more first messages do comprise one or more viruses, and determining that the one or more first messages do comprise one or more viruses;
wherein the method is performed by one or more processors.

27. A method as recited in claim 26, wherein the file type is any of EXE, ZIP, COM, SCR, BAT, and PIF.

28. A method as recited in claim 26, wherein receiving one or more sets of message information comprises receiving at least one set of message information from a spamtrap.

29. A method as recited in claim 26, wherein receiving one or more sets of message information comprises receiving, from one or more spamtraps, one or more counts of messages that are suspected to be with computer viruses, wherein the messages were determined by the virus-check component as not comprising a virus.

30. A method as recited in claim 26, wherein the virus outbreak information indicates initiation of a virus attack when the virus outbreak information satisfies a specified relationship with a specified threshold.

31. A method as recited in claim 26, wherein for each of a plurality of file attachment types of the one or more first messages to result in generating a plurality of percent-of-normal virus score values respectively associated with each of the plurality of file attachment types.

32. A method as recited in claim 31, further comprising computing an average of all the plurality of percent-of-normal virus score values to create an overall percent-of-normal value, and mapping the overall percent-of-normal value to the range of virus score values, to result in creating a particular virus score value for a particular file attachment type.

33. A method, comprising the computer-implemented steps of:
   receiving one or more sets of message information for one or more first messages that are suspected to be associated with computer viruses;
   sending the one or more sets of message information to a virus-check component to determine whether the one or more first messages comprise one or more viruses;
   receiving an indication from the virus-check component that the one or more first messages do not comprise any viruses;
   in response to receiving the indication that the one or more first messages do not comprise any viruses and that the one or more first messages was sent from a source not known to be associated with viruses but that sent a large number of messages according to a message sending pattern suspected to be associated with computer viruses and comprising at least one attachment, and based on mapping the one or more sets of message information received in a specified time period to virus outbreak information by generating a current average virus score value by combining one or more prior virus score values associated with respective one or more prior time periods, generating a percent-of-normal virus score value by comparing the current average virus score value with a long-term average virus score value and mapping the percent-of-normal virus score value to a range of virus score values, determining that the one or more first messages do comprise one or more viruses; and
   in response to the determining that the one or more first messages do comprise one or more viruses, performing a message flow control action for one or more second messages that are also suspected to be associated with computer viruses as said first message;
   wherein the method is performed by one or more processors.

34. The method of claim 33, wherein said one or more first messages are suspected to be associated with computer viruses if the one or more first messages include one or more of the following:
   (a) an Internet Protocol (IP) address associated with the sender of said message,
   (b) a number of hops taken by said message prior to receipt,
   (c) an amount of aggregated data associated with said sender of said message, and
   (d) a mime structure associated with said message.

35. A non-transitory machine-readable storage medium storing one or more sequences of instructions, which instructions, when executed by one or more processors, cause the one or more processors to perform:
   receiving one or more sets of message information for one or more first messages that are suspected to be associated with computer viruses;
   sending the one or more sets of message information to a virus-check component to determine whether the one or more first messages comprise one or more viruses;
   in response to receiving the indication that the one or more first messages do not comprise any viruses and that the one or more first messages was sent from a source not known to be associated with viruses but that sent a large number of messages according to a message sending pattern suspected to be associated with computer viruses and comprising at least one attachment, and based on mapping the one or more sets of message information received in a specified time period to virus outbreak information by generating a current average virus score value by combining one or more prior virus score values associated with respective one or more prior time periods, generating a percent-of-normal virus score value by comparing the current average virus score value with a long-term average virus score value and mapping the percent-of-normal virus score value to a range of virus score values, determining that the one or more first messages do comprise one or more viruses; and
   in response to determining that the one or more first message do comprise one or more viruses, performing a message flow control action for one or more second messages that are also suspected to be associated with computer viruses as the one or more first messages.

36. An apparatus, comprising:
   one or more processors;
   means for receiving one or more sets of message information for one or more first messages that are suspected to be associated with computer viruses;
   means for sending the one or more sets of message information to a virus-check component to determine whether the one or more first messages comprise one or more viruses;
   means for receiving an indication from the virus-check component that the one or more first messages do not comprise any viruses;
   means for determining that the one or more first messages do comprise one or more viruses in response to receiving the indication that the one or more first messages do not comprise any viruses and that the one or more first messages was sent from a source not known to be associated with viruses but that sent a large number of messages according to a message sending pattern suspected to be associated with computer viruses and comprising at least one attachment, and based on mapping the one or more sets of message information received in a specified time period to virus outbreak information by generating a current average virus score value by combining one or more prior virus score values associated with respective one or more prior time periods, generating a percent-of-normal virus score value by comparing the current average virus score value with a long-term average virus score value and mapping the percent-of-normal virus score value to a range of virus score values; and
   means for performing a message flow control action for one or more second messages that are also suspected to be associated with computer viruses as the one or more first messages in response to the determining that the one or more first messages do comprise one or more viruses.

37. An apparatus, comprising:
   a network interface that is coupled to a data network for receiving one or more packet flows therefrom;

a processor;

one or more stored sequences of instructions which, when executed by the processor, cause the processor to perform:

receiving one or more sets of message information for one or more first messages that are suspected to be associated with computer viruses;

sending the one or more sets of message information to a virus-check component to determine whether the one or more first messages comprise one or more viruses;

receiving an indication from the virus-check component that the one or more first messages do not comprise any viruses;

in response to receiving the indication that the one or more first messages do not comprise any viruses and that the one or more first messages was sent from a source not known to be associated with viruses but that sent a large number of messages according to a message sending pattern suspected to be associated with computer viruses and comprising at least one attachment, and based on mapping the one or more sets of message information received in a specified time period to virus outbreak information by generating a current average virus score value by combining one or more prior virus score values associated with respective one or more prior time periods, generating a percent-of-normal virus score value by comparing the current average virus score value with a long-term average virus score value and mapping the percent-of-normal virus score value to a range of virus score values, determining that the one or more first messages do comprise one or more viruses; and in response to the determining that the one or more first messages do comprise one or more viruses, performing a message flow control action for one or more second messages that are also suspected to be associated with computer viruses as the one or more first messages.

\* \* \* \* \*